(12) United States Patent
Toll et al.

(10) Patent No.: US 10,564,966 B2
(45) Date of Patent: Feb. 18, 2020

(54) PACKED DATA OPERATION MASK SHIFT PROCESSORS, METHODS, SYSTEMS, AND INSTRUCTIONS

(75) Inventors: Bret L. Toll, Hillsboro, OR (US); Robert Valentine, Kiryat Tivon (IL); Jesus Corbal San Adrian, Barcelona (ES); Elmoustapha Ould-Ahmed Vall, Phoenix, AZ (US); Mark J. Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 1366 days.

(21) Appl. No.: 13/977,171

(22) PCT Filed: Dec. 22, 2011

(86) PCT No.: PCT/US2011/066863
§ 371 (c)(1),
(2), (4) Date: Jun. 28, 2013

(87) PCT Pub. No.: WO2013/095513
PCT Pub. Date: Jun. 27, 2013

(65) Prior Publication Data
US 2013/0275719 A1     Oct. 17, 2013

(51) Int. Cl.
*G06F 9/30* (2018.01)
(52) U.S. Cl.
CPC ...... *G06F 9/30032* (2013.01); *G06F 9/30018* (2013.01)
(58) Field of Classification Search
CPC .................................................. G06F 9/30018
See application file for complete search history.

(56) References Cited

U.S. PATENT DOCUMENTS 5,353,420 A * 10/1994 Zaidi ............... G06F 9/30149
712/207
6,098,087 A   8/2000 Lemay
(Continued)

FOREIGN PATENT DOCUMENTS

CN    1185606 A    6/1998
CN    1200822 A    12/1998
(Continued)

OTHER PUBLICATIONS

John Hennessy and David Patterson, Computer Architecture A Quantitative Approach, 2007, Morgan Kaufmann, Fourth edition, 189 pages.*

(Continued)

*Primary Examiner* — Jyoti Mehta
(74) *Attorney, Agent, or Firm* — Nicholson De Vos Webster & Elliott LLP

(57) ABSTRACT

A method of an aspect includes receiving a packed data operation mask shift instruction. The packed data operation mask shift instruction indicates a source having a packed data operation mask, indicates a shift count number of bits, and indicates a destination. The method further includes storing a result in the destination in response to the packed data operation mask shift instruction. The result includes a sequence of bits of the packed data operation mask that have been shifted by the shift count number of bits. Other methods, apparatus, systems, and instructions are disclosed.

29 Claims, 21 Drawing Sheets

(56) References Cited

U.S. PATENT DOCUMENTS

| | | | |
|---|---|---|---|
| 7,451,169 B2 | 11/2008 | Lin et al. | |
| 2002/0112147 A1* | 8/2002 | Chennupaty | G06F 9/30025 712/223 |
| 2005/0198473 A1* | 9/2005 | Ford | G06F 7/76 712/221 |
| 2006/0235914 A1 | 10/2006 | Lin et al. | |
| 2007/0239810 A1 | 10/2007 | Lin et al. | |
| 2008/0082791 A1* | 4/2008 | Chennupaty | G06F 9/30101 712/217 |
| 2008/0215855 A1 | 9/2008 | Abdallah et al. | |
| 2008/0301415 A1* | 12/2008 | Maeda | G06F 9/455 712/225 |
| 2009/0187739 A1 | 7/2009 | Nemirovsky et al. | |

FOREIGN PATENT DOCUMENTS

| | | |
|---|---|---|
| CN | 102103487 A | 6/2011 |
| CN | 102246524 A | 11/2011 |
| TW | 310406 B | 7/1997 |
| TW | 200424929 A | 11/2004 |
| TW | 200805146 A | 1/2008 |
| WO | 97/08608 A1 | 3/1997 |
| WO | 2013/095513 A1 | 6/2013 |

OTHER PUBLICATIONS

PowerPC User Instruction Set Architecture Book 1, Sep. 2003, Version 2.01, 219 pages, [retrieved from the internet on Jan. 9, 2017], retrieved from URL <math-atlas.sourceforge.net/devel/assembly/ppc_isa.pdf>.*

MIPS64 Architecture for Programmers vol. II: The MIPS64 Instruction Set, Mar. 12, 2001, MIPS Technologies, Revision 0.95, 341 pages, [retrieved from the internet on Jan. 9, 2017], retrieved from URL <equipe.nce.ufrj.br/gabriel/arqcomp2/MIPS64_Instruction_Set_v0.95.pdf>.*

Shift Instructions, Jul. 20, 2010, 7 pages, [retrieved from the internet on Jan. 4, 2017], retrieved from URL <faculty.cs.niu.edu/~byrnes/csci360/notes/360shift.htm>.*

Michael Abrash, A first look at the Larrabee New Instructions, Apr. 1, 2009, Dr. Dobbs The world of software development, 14 pages, [retrieved from the internet on Oct. 21, 2017], retrieved from URL <www.drdobbs.com/parallel/a-first-look-at-the-larrabee-new-instruc/216402188>.*

Mark Probst, Dynamic Binary Translation, Nov. 19, 2003, 13 pages, [retrieved from the internet on Oct. 24, 2017], retrieved from URL <www.complang.tuwien.ac.at/cd/papers/bintrans.pdf>.*

Office Action received for Taiwan Patent Application No. 101146182, dated Nov. 12, 2014, 19 pages of Office Action including 11 pages of English Translation.

Notice of Allowance received for Taiwan Patent Application No. 101146182, dated Aug. 12, 2015, 2 pages of Taiwan Notice of Allowance.

Office Action received for Chinese Patent Application No. 201180075868.2, dated Aug. 22, 2016, 13 pages of Chinese Office Action including 7 pages of English Translation.

PCT/US2011/066863, Notification of Transmittal of the International Search Report and Written Opinion of the International Searching Authority, dated Aug. 27, 2012, 11 pages.

Office Action received for Chinese Patent Application No. 201180075868.2, dated Apr. 25, 2017, 7 pages of Chinese Office Action including 4 pages of English Translation.

Intel, "Intel 64 and IA-32 Architectures Software Developer's Manual", vol. 1: Basic Architecture, Order No. 253665-040US, Oct. 2011, 548 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual", vol. 3 (3A, 3B & 3C): System Programming Guide, Order No. 325384-040US, Oct. 2011, 1916 pages.

Intel, "Intel Advanced Vector Extensions Programming Reference", Jun. 2011, 595 pages.

Intel, "Intel 64 and IA-32 Architectures Software Developer's Manual", Instruction Set Reference, A-M, vol. 2A, Order No. 253666-039US, May 2011, 832 pages.

Office Action received for Chinese Patent Application No. 201180075868.2, dated Sep. 1, 2017, 10 pages of Chinese Office Action including 6 pages of English Translation.

International Preliminary Report on Patentability and Written Opinion received for PCT Application No. PCT/US2011/066863 dated Jul. 3, 2014, 7 pages.

First Office Action and Search Report from foreign counterpart Chinese Patent Application No. 201610865103.3, dated Apr. 18, 2018, 15 pages.

Notice on Grant of Patent Right for Invention from foreign counterpart Chinese Patent Application No. 201180075868.2, dated Apr. 4, 2018, 4 pages.

Notice on Grant of Patent Right for Invention from foreign counterpart Chinese Patent Application No. 201610865103.3, dated Dec. 3, 2018, 4 pages.

* cited by examiner

NUMBER OF PACKED DATA
OPERATION MASK BITS
923

| DATA ELEMENT WIDTH | PACKED DATA WIDTH | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS / SP | 4 | 8 | 16 |
| 64-BIT QWORDS / DP | 2 | 4 | 8 |

PACKED DATA
OPERATION MASK
REGISTERS
1008

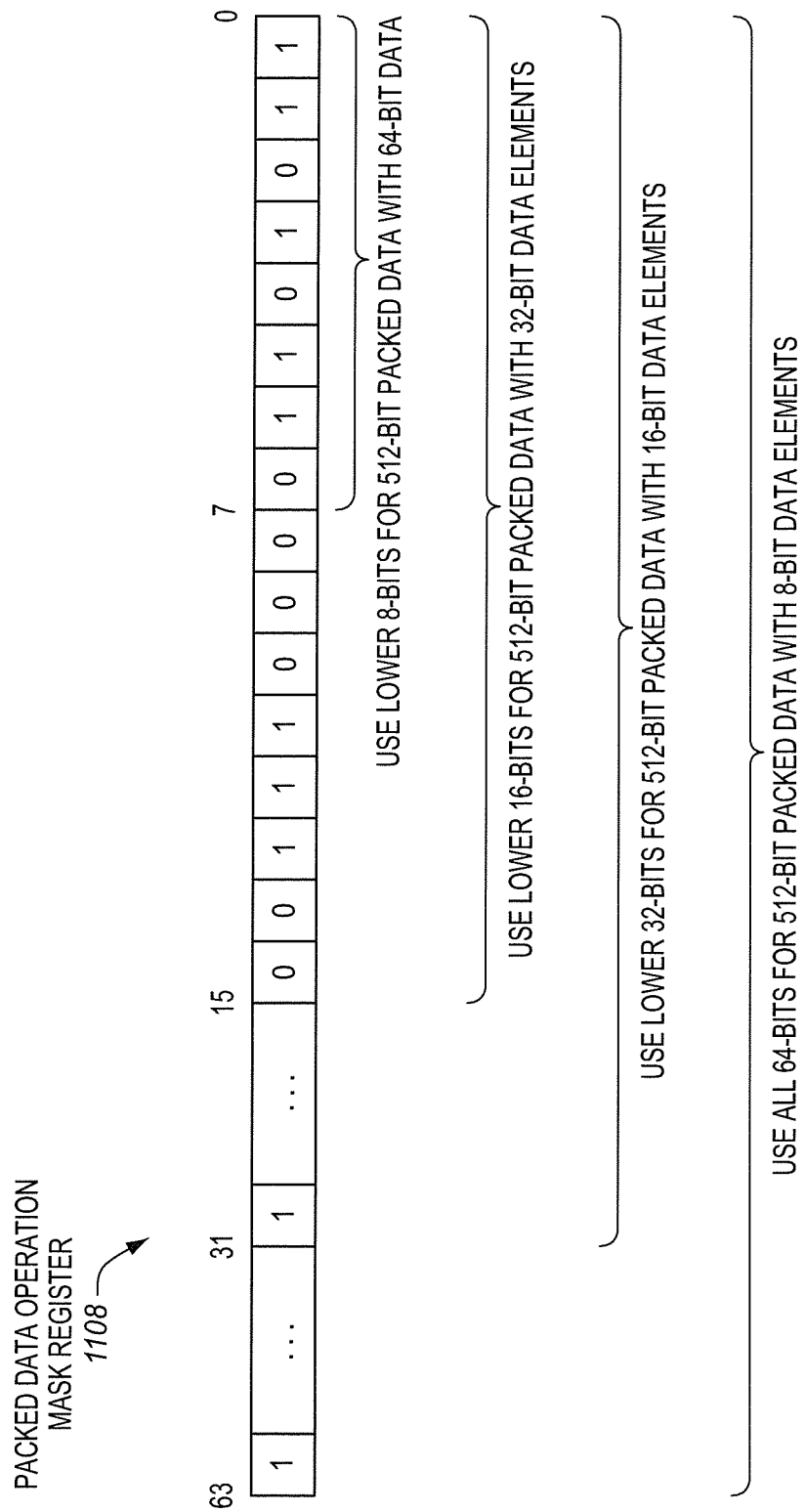

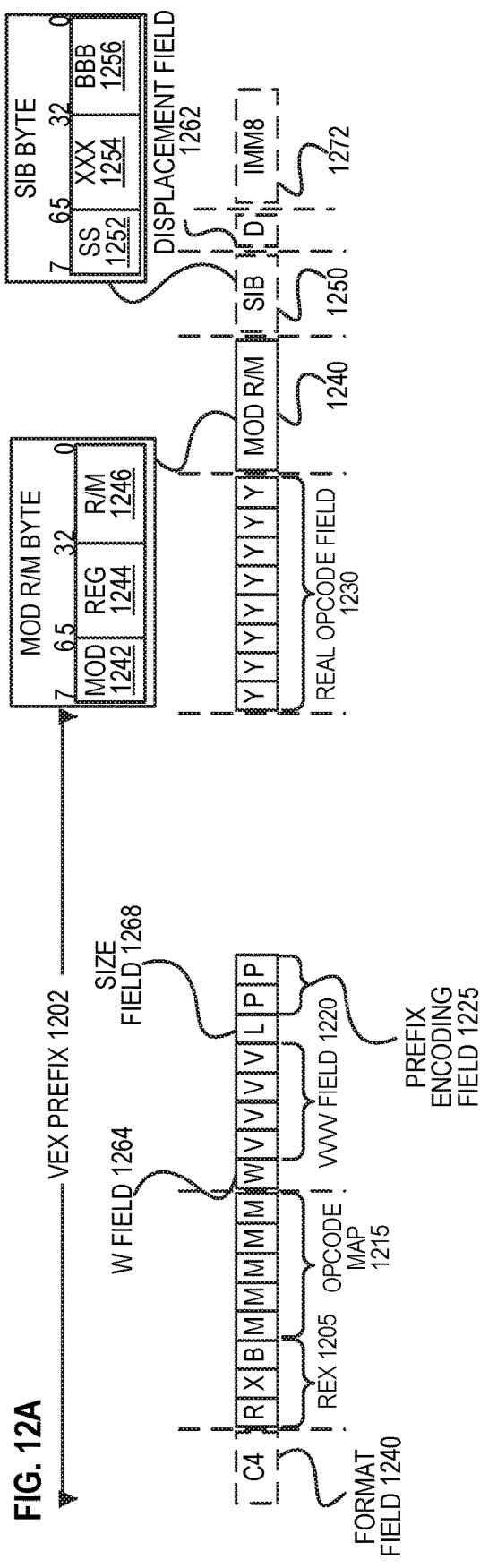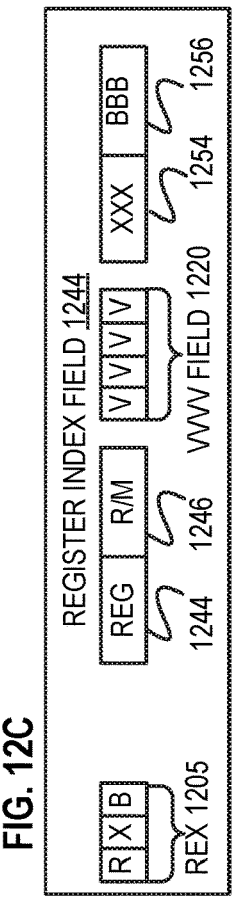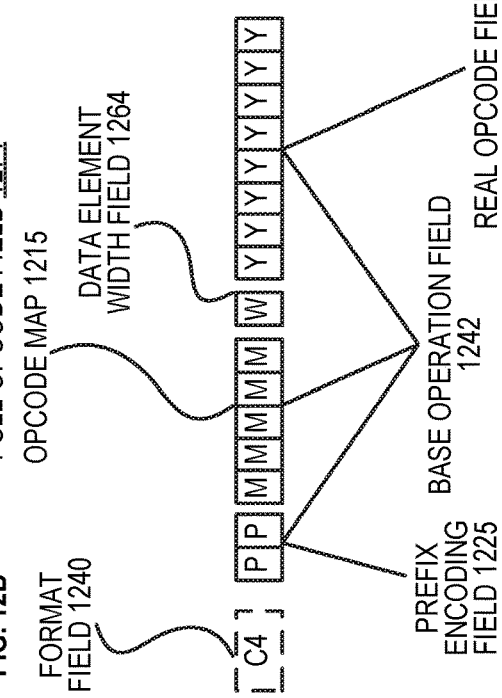
FIG. 12A
FIG. 12B
FIG. 12C

FIG. 13
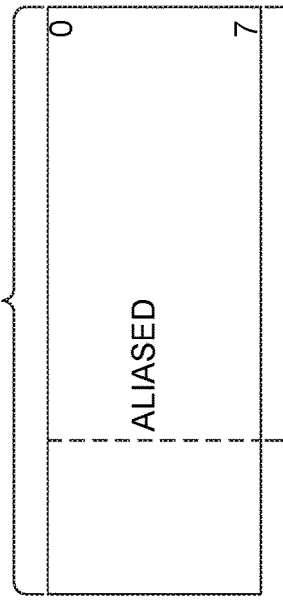
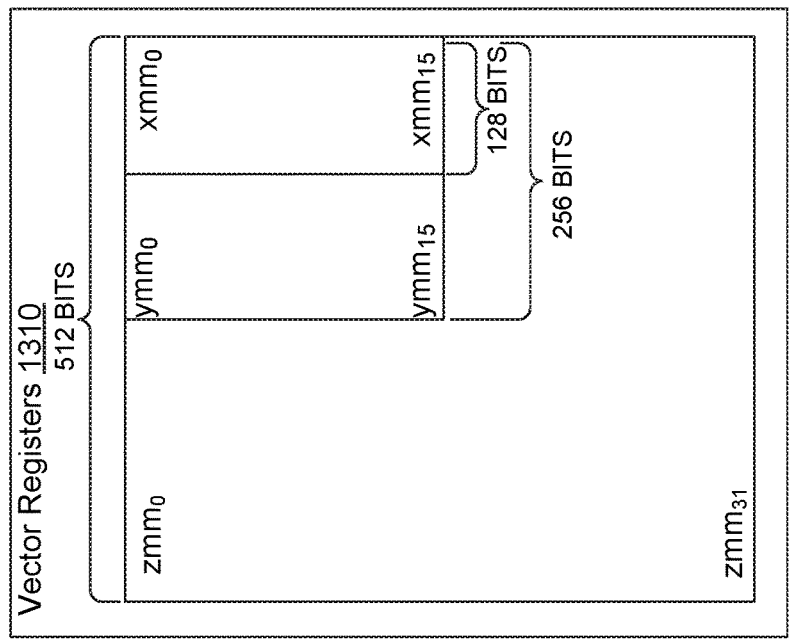

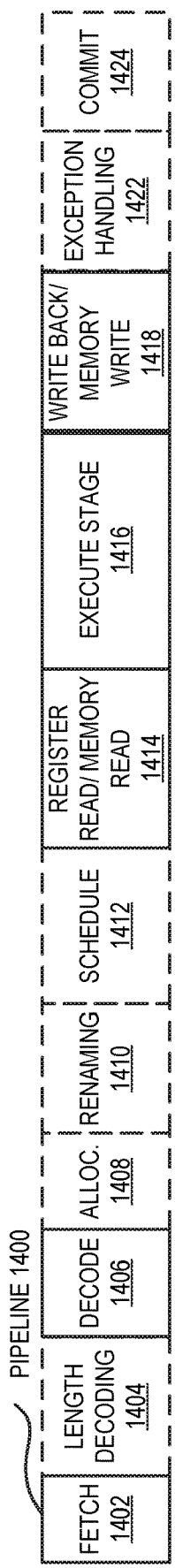
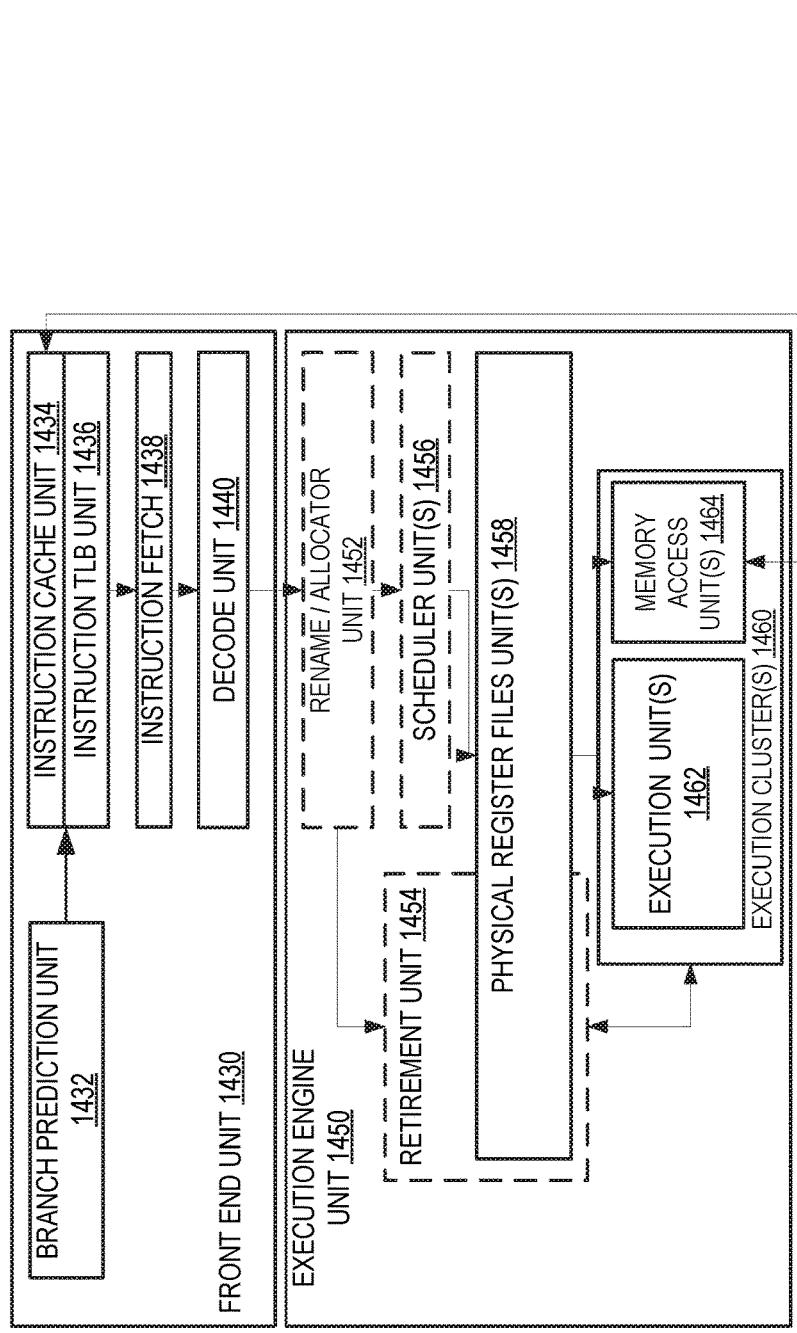
FIG. 14A
FIG. 14B

PACKED DATA OPERATION MASK SHIFT PROCESSORS, METHODS, SYSTEMS, AND INSTRUCTIONS

CROSS-REFERENCE TO RELATED APPLICATION

This patent application is a U.S. National Phase Application under 35 U.S.C. § 371 of International Application No. PCT/US2011/066863, filed Dec. 22, 2011, entitled PACKED DATA OPERATION MASK SHIFT PROCESSORS, METHODS, SYSTEMS, AND INSTRUCTIONS.

BACKGROUND

Field

Embodiments relate to processors. In particular, embodiments relate to processors to shift sequences of bits of packed data operation masks responsive to packed data operation mask shift instructions.

Background Information

Many processors have Single Instruction, Multiple Data (SIMD) architectures. The SIMD architectures generally help to significantly improve processing speed. In SIMD architectures, instead of a scalar instruction operating on only one data element or pair of data elements, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

In SIMD architectures multiple data elements may be packed within one register or memory location as packed data or vector data. In packed data, the bits of the register or other storage location may be logically divided into a sequence of multiple fixed-sized data elements. Each of the data elements may represent an individual piece of data that is stored in the register or storage location along with other data elements typically having the same size. For example, a 256-bit wide register may have four 64-bit wide packed data elements, eight 32-bit wide packed data elements, sixteen 16-bit wide packed data elements, or thirty-two 8-bit wide packed data elements. Each of the packed data elements may represent a separate individual piece of data (e.g., a color of a pixel, etc.) that may be operated upon separately or independently of the others.

Representatively, one type of packed data instruction, vector instruction, or SIMD instruction (e.g., a packed add instruction) may specify that a single packed data operation (e.g., addition) be performed on all corresponding pairs of data elements from two source packed data operands in a vertical fashion to generate a destination or result packed data. The source packed data operands may be of the same size, may contain data elements of the same width, and thus may each contain the same number of data elements. The source data elements in the same bit positions in the two source packed data operands may represent pairs of corresponding data elements. The packed data operation may be performed separately or independently on each of these pairs of corresponding source data elements to generate a matching number of result data elements, and thus each pair of corresponding source data elements may have a corresponding result data element. Typically, the result data elements for such an instruction are in the same order and they often have the same size. Other packed data instructions include packed data shift instructions that independently shift each data element of a single packed data.

In addition to this exemplary type of packed data instruction, there are a variety of other types of packed data instructions. For example, there are those that have only one, or more than two, source packed data operands, those that operate in a horizontal fashion instead of a vertical fashion, those that generate a result packed data operand of a different size, those that have different sized data elements, and/or those that have a different data element order.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 11 is a diagram illustrating that the number of bits in an example embodiment of a packed data operation mask register that are used as a packed data operation mask or for masking depends upon the packed data width and the data element width.

FIG. 12A illustrates an exemplary AVX instruction format including a VEX prefix, real opcode field, Mod R/M byte, SIB byte, displacement field, and IMM8.

FIG. 12B illustrates which fields from FIG. 12A make up a full opcode field and a base operation field.

FIG. 12C illustrates which fields from FIG. 12A make up a register index field.

FIG. 13 is a block diagram of a register architecture according to one embodiment of the invention.

FIG. 14A is a block diagram illustrating both an exemplary in-order pipeline and an exemplary register renaming, out-of-order issue/execution pipeline according to embodiments of the invention.

FIG. 14B shows processor core including a front end unit coupled to an execution engine unit, and both are coupled to a memory unit.

DETAILED DESCRIPTION

Disclosed herein are packed data operation mask shift instructions, processors to execute the packed data operation mask shift instructions, methods performed by the processors when processing or executing the packed data operation mask shift instructions, and systems incorporating one or more processors to process or execute the packed data operation mask shift instructions. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
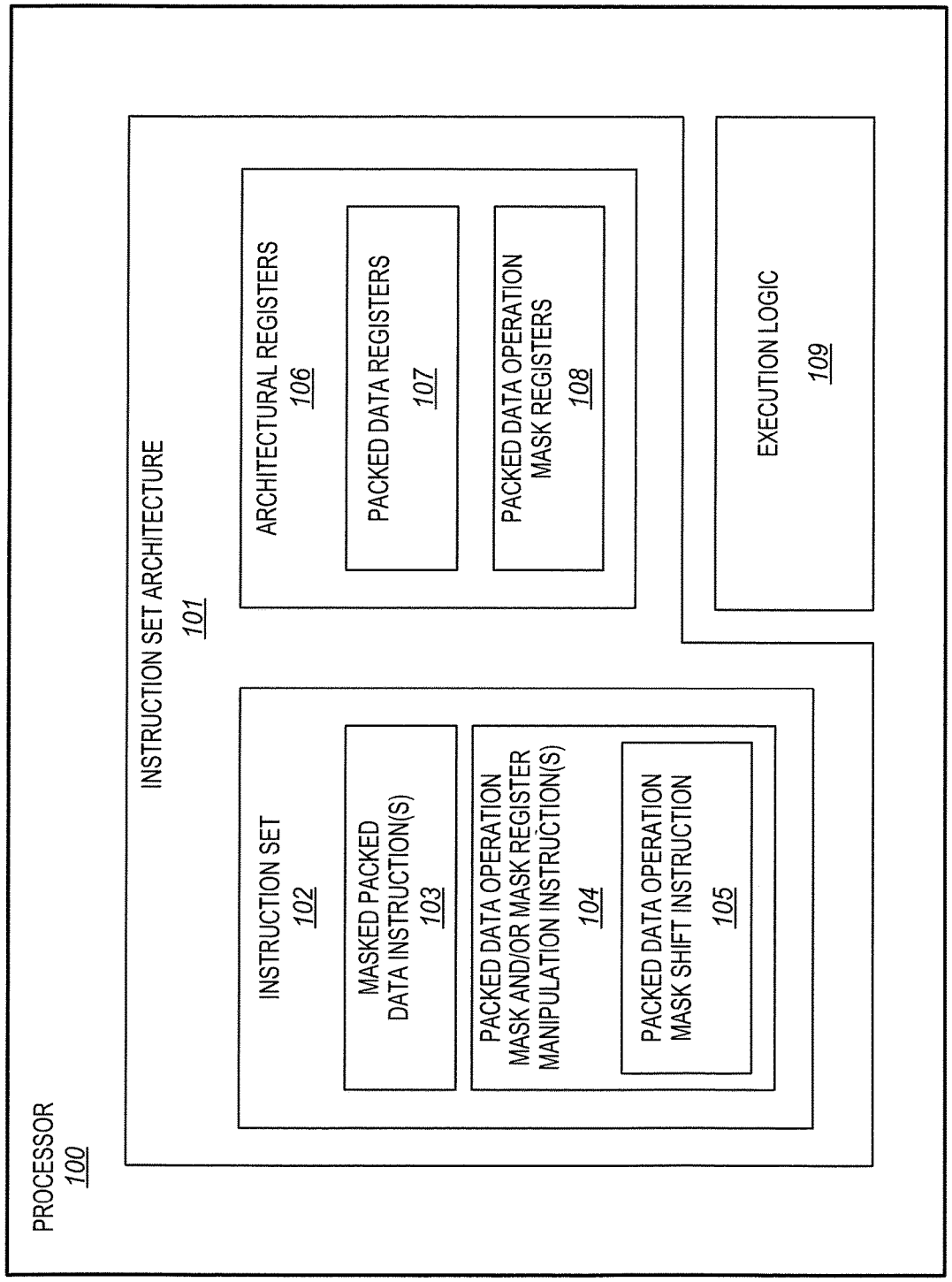
FIG. 1 is a block diagram of an example embodiment of a processor having an instruction set including one or more packed data operation mask shift instructions.

FIG. 1 is a block diagram of an example embodiment of a processor 100 having an instruction set including one or more packed data operation mask shift instructions 105. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor (e.g., a general-purpose microprocessor of the type used in desktop, laptop, and like computers), although this is not required. Alternatively, the instruction processing apparatus may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor has an instruction set architecture (ISA) 101. The ISA represents the part of the architecture of the processor related to programming. The ISA commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the instruction set architecture. Processors with different microarchitectures may share a common instruction set architecture.

The ISA includes architectural registers (e.g., an architectural register file) 106. The illustrated architectural registers include packed data registers 107. Each of the packed data registers is operable to store packed data, vector data, or SIMD data. The illustrated architectural registers also include packed data operation mask registers 108. Each of the packed data operation mask registers is operable to store a packed data operation mask.

The architectural registers represent on-board processor storage locations. The architectural registers may also be referred to herein simply as registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

The illustrated ISA also includes an instruction set 102 that is supported by the processor. The instruction set includes several different types of instructions. These instructions of the instruction set represent macroinstructions (e.g., instructions provided to the processor for execution), as opposed to microinstructions or micro-ops (e.g., which result from a decoder of the processor decoding macroinstructions).

The instruction set includes one or more masked packed data instructions 103. The masked packed data instructions may be similar to the packed data instructions mentioned in the background section with a few notable differences. Similar to the aforementioned packed data instructions, each of the masked packed data instructions may be operable to cause or result in the processor performing a packed data operation on data elements of one or more packed data operands that are indicated by the packed data instruction. The packed data operands may be stored in the packed data registers 107. However, each of the masked packed data instructions may use one or more packed data operation mask registers 108 and/or packed data operation masks to mask, predicate, or conditionally control the packed data processing. The packed data operation masks and/or mask registers may represent mask operands, predicate operands, or conditional operation control operands.

The packed data operation masks and/or mask registers may be operable to mask or conditionally control packed data processing at per-data element granularity. For example, the packed data operation masks may be operable to mask whether or not a result of a packed data operation of the masked packed data instruction, performed on individual data elements from a single source packed data operand or individual pairs of corresponding data elements from two source packed data operands, is to be stored in a packed data result. The masked packed data instructions may allow packed data processing of each data element or pair of corresponding data elements to be predicated or conditionally controlled separately and independently of the data elements. The masked packed data instructions, operations, and masks may offer certain advantages, such as, for example, increased code density and/or higher instruction throughput.

Referring again to FIG. 1, the instruction set also includes one or more packed data operation mask and/or mask register manipulation instructions 104. Each of the packed data operation mask and/or mask register manipulation instructions may be operable to cause or result in the processor manipulating or operating on one or more packed data operation mask registers 108 and/or masks. As shown, the packed data operation mask and/or mask register manipulation instructions may include one or more packed data operation mask shift instructions 105. Each of the packed data operation mask shift instructions 105 may be operable to cause or result in the processor storing a result in a destination that includes a sequence of bits of a packed data operation mask that have been shifted by a shift count number of bits. Various different embodiments of packed data operation mask shift instructions will be disclosed further below.

The processor also includes execution logic 109. The execution logic is operable to execute or process the instructions of the instruction set (e.g., the masked packed data instructions and the packed data operation mask shift instructions). The execution logic may include one or more execution units, functional units, arithmetic units, arithmetic logic units, logic units, shifters, etc.

Figure 2A:
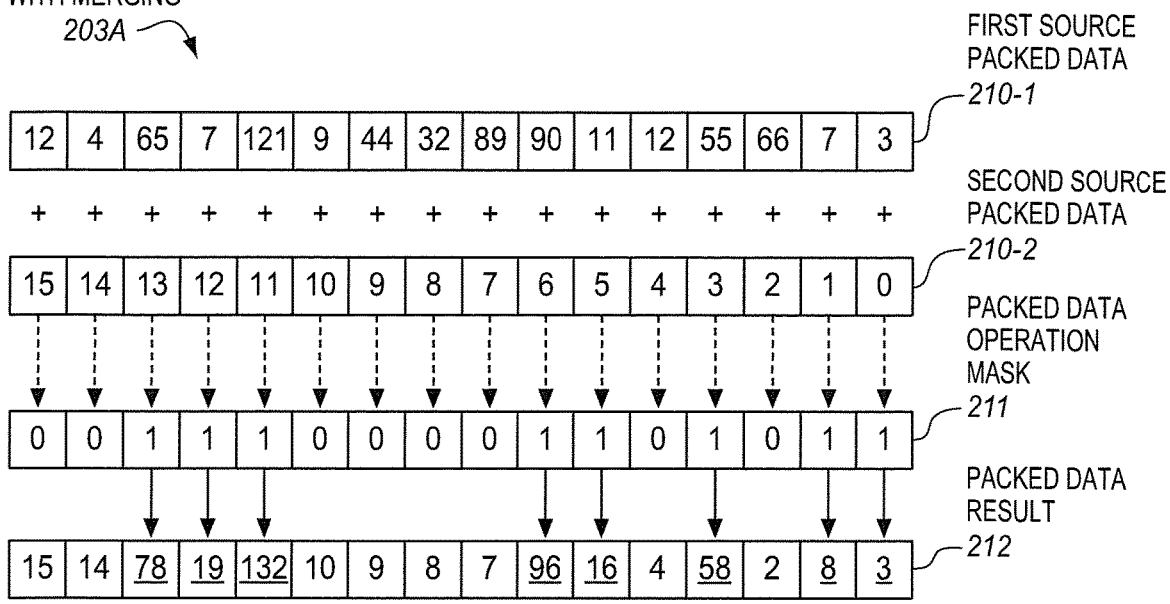
FIG. 2A is a block diagram illustrating a first representative example embodiment of a masked packed data operation with merging.

To further illustrate packed data operation masks, it may be helpful to consider a representative example of their use. FIG. 2A is a block diagram illustrating a first representative example embodiment of a masked packed data operation with merging 203A. The masked packed data operation may be performed in response to, or as a result of, a masked packed data instruction (e.g., one of the masked packed data instructions 103 of FIG. 1).

The instruction for the illustrated masked packed data operation indicates a first source packed data 210-1 and a second source packed data 210-2. Other masked packed data instructions (e.g., a packed shift instruction) may indicate only a single source packed data, or more than two source packed data. In the illustration, the first and second source packed data are of the same size, contain data elements of the same width, and thus each contain the same number of data elements. In the illustration, each of the first and second source packed data have sixteen data elements. By way of example, the first and second source packed data may each be 512-bits wide and may each include sixteen 32-bit doubleword data elements. The source data elements in the same bit positions in the two source packed data (e.g., in the same vertical positions) represent pairs of corresponding data elements. Each of the data elements has a numerical value shown within the block representing the data element. For example, the lowest order data element (on the right) of the first source packed data has a value of 3, the next-to-lowest order data element of the first source packed data has a value of 7, the highest-order data element (on the left) of the first source packed data has a value of 12, etc.

The instruction of the masked packed data operation also indicates a packed data operation mask 211. The packed data operation mask includes multiple mask elements, predicate elements, conditional control elements, or flags. The elements or flags may be included in a one-to-one correspondence with one or more corresponding source data elements. For example, as shown in the illustration, there may be one such element or flag for each pair of corresponding source data elements in the case of the operation involving two source packed data operands. Each element or flag of the packed data operation mask may be operable to mask a separate packed data operation on the one or more corresponding source packed data elements. For example, in this example, each element or flag may mask a separate packed data operation on a pair of corresponding source packed data elements.

As shown in the illustration, commonly each element or flag may be a single bit. A single bit may allow specifying either of two different possibilities (e.g., perform the operation versus do not perform the operation, store a result of the operation versus do not store a result of the operation, etc.). Alternatively, if selecting between more than two different options is desired, then two or more bits may be used for each flag or element. In the illustration, the packed data operation mask includes sixteen bits (i.e., 0011100001101011). Each of the sixteen bits has an ordered correspondence to one of the sixteen pairs of corresponding data elements of the first and second packed data. For example, the lowest-order bit of the mask corresponds to the pair of corresponding lowest-order data elements of the first and second packed data, the highest-order bit of the mask corresponding to the pair of corresponding highest-order data elements, etc. In alternate embodiments, where the source packed data have either less or more data elements, the packed data operation mask may similarly have either less or more data elements.

The particular illustrated masked packed data operation is a masked packed data addition operation that is operable to conditionally store sums of pairs of corresponding data elements from the first and second source packed data 210-1, 210-2 in the packed data result 212 in accordance with the conditional operation control or predication provided by the corresponding bits of the packed data operation mask 211. This particular masked packed data addition operation specifies that a single operation (in this case addition) is to be conditionally performed in a vertical fashion on each pair of corresponding data elements separately or independently of the other pairs. The destination operand or packed data result is of the same size as the source packed data and has the same number of data elements as the source packed data. Accordingly, each pair of corresponding source data elements has a corresponding result data element in the same bit positions of the packed data result as their corresponding pair of source data elements in the source packed data.

Referring again to the packed data operation mask 211. Each of the sixteen bits of the packed data operation mask is either set (i.e., has a binary value of 1) or is cleared (i.e., has a binary value of 0). According to the illustrated convention, each bit is set (i.e., 1) or cleared (i.e., 0), respectively, to allow or not allow a result of the packed data operation, performed on a corresponding pair of data elements of the first and second source packed data, to be stored in a corresponding data element of the packed data result. For example, the next-to-lowest-order bit in the packed data operation mask is set (i.e., 1), and the sum (i.e., 8) representing the result of the packed data addition operation performed on the pair of corresponding next-to-lowest-order data elements (i.e., 7+1) is stored in the corresponding next-to-lowest-order data element of the packed data result. In the illustration, the sums are underlined.

Conversely, when the given bit is cleared (i.e., 0), then a result of a packed data operation on a corresponding pair of data elements is not allowed to be stored in the corresponding data element of the packed data result. Rather, another value may be stored in the result data element. For example, as shown in the illustration, the value of the corresponding data element from the second source packed data may be stored in the corresponding data element of the packed data result. For example, the highest-order bit in the packed data operation mask is cleared (i.e., 0), and the numerical value (i.e., 15) of the highest-order data element from the second source packed data is stored in the highest-order data element of the packed data result. This is referred to as merging-masking. An opposite convention to that illustrated is also possible where bits are cleared (i.e., 0) to allow the results to be stored, or set (i.e., 1) to not allow the results to be stored.

In some embodiments, the packed data operation may optionally be performed on all corresponding pairs of data elements of the first and second source packed data regardless of whether the corresponding bits of the packed data operation mask are set or cleared, but the results of the packed data operation may or may not be stored in the packed data result depending upon whether the corresponding bits of the packed data operation mask are set or cleared. Alternatively, in another embodiment, the packed data operation may optionally be omitted (i.e., not performed) if the corresponding bit of the packed data operation mask specifies that the result of the operation is not to be stored in the packed data result operation. In some embodiments, exceptions (e.g., exception flags) or violations may optionally be suppressed or not raised by a packed data operation on a masked-off element. In some embodiments, for masked packed data instructions with a memory operand, memory faults may optionally be suppressed for masked-off data elements. This feature may help to implement control-flow predication, since the mask may in effect provide a merging behavior packed data registers, but is not required.

Figure 2B:
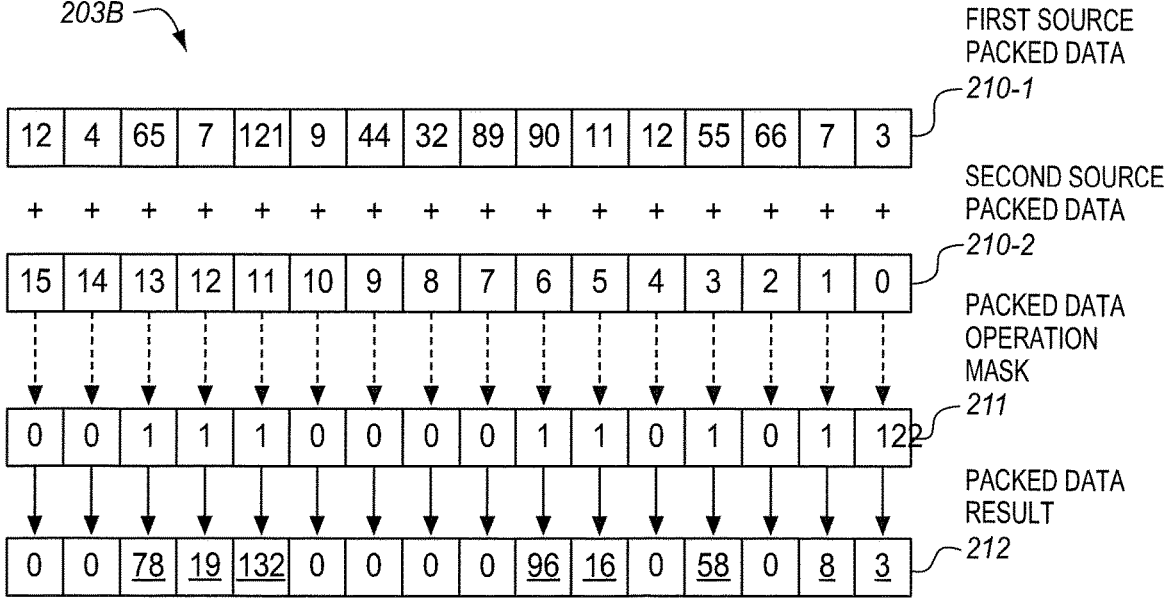
FIG. 2B is a block diagram illustrating a second representative example embodiment of a masked packed data operation with zeroing.

FIG. 2B is a block diagram illustrating a second representative example embodiment of a masked packed data operation with zeroing 203B. The masked packed data operation with zeroing is similar to the aforementioned masked packed data operation with merging. To avoid obscuring the description, the similarities will not be repeated, but rather, the differences will primarily be mentioned. One notable difference is that, instead of merging or storing values of data elements of a source packed data (e.g., the second source packed data 210-2 in FIG. 2A) into the corresponding data elements of the packed data result, when the corresponding bits of the packed data result are masked off (e.g., cleared to 0), the corresponding data elements of the packed data result may be zeroed out. For example, all 32-bits of a doubleword result packed data element may have a value of zero. This is referred to as zeroing-masking. Alternatively, other predetermined values besides zero may optionally be used.

These are just a few illustrative examples of masked packed data operations. It is to be appreciated that a processor may support a wide variety of different types of masked packed data operations. For example, these may include those that have only one, or have more than two, source packed data, those that generate a result packed data of a different size, those that have different sized data elements, and/or those that have a different result data element order, and combinations thereof.

Figure 3:
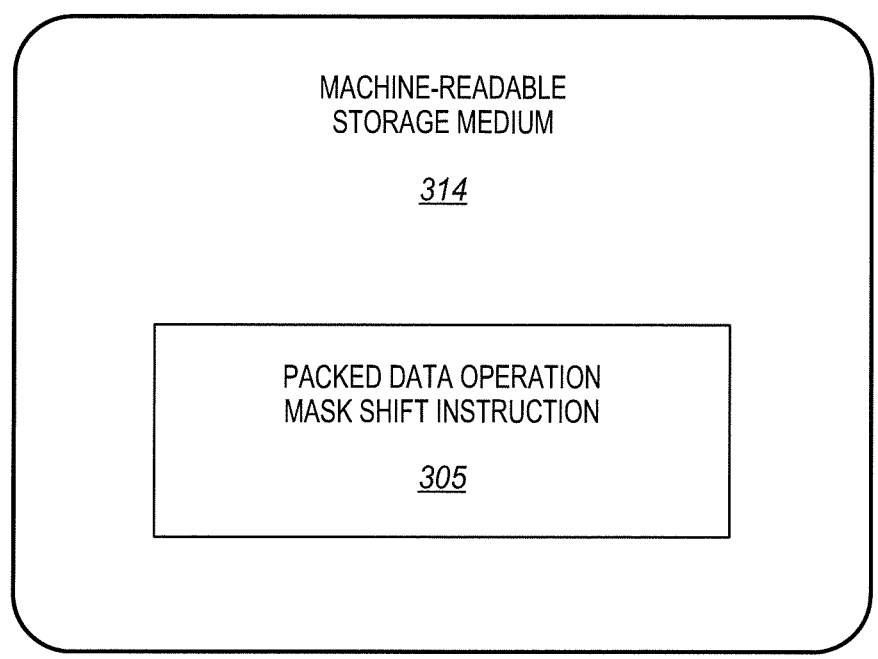
FIG. 3 is a block diagram of an article of manufacture (e.g., a computer program product) including a machine-readable storage medium storing a packed data operation mask shift instruction.

FIG. 3 is a block diagram of an article of manufacture (e.g., a computer program product) 313 including a machine-readable storage medium 314 that stores a packed data operation mask shift instruction 305. In some embodiments, the machine-readable storage medium may be a tangible and/or non-transitory machine-readable storage medium. In various example embodiments, the machine-readable storage medium 314 may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid materials, such as, for example, a semiconductor material, a phase-change material, a magnetic material, an optically transparent solid material, etc.

The packed data operation mask shift instruction 305 is operable to specify or otherwise to indicate a source having a packed data operation mask, to specify or otherwise to indicate a shift count number of bits, and to specify or otherwise to indicate a destination. In some embodiments, the packed data operation mask shift instruction may be operable to explicitly specify the source and the destination. In some embodiments, the source and the destination may each be a packed data operation mask register. The instruction may have bits or one or more fields defined by an instruction format or encoding of the instruction to explicitly specify the packed data operation mask register and the destination. In some embodiments, the packed data operation mask shift instruction may follow a VEX encoding scheme, although this is not required. Further details of the VEX encoding scheme, if desired, although not necessary for understanding the present description, are available in the document The Intel® 64 and IA-32 Architectures Software Developer's Manual, Order Number: 253666-039US, May 2011, by Intel Corporation, of Santa Clara, Calif. Alternatively, the instruction may implicitly indicate one or more of the source and/or the destination. In some embodiments, the source and destination may be different packed data operation mask registers. In other embodiments, the same packed data operation mask register may be used for both the source and the destination, and the initial bits of the source mask may be overwritten by the shifted packed data operation mask.

The packed data operation mask shift instruction, if executed by a machine (e.g., a processor or instruction processing apparatus), is operable to cause the machine to store a result in the destination in response to the packed data operation mask shift instruction. The result may include a sequence of bits of the packed data operation mask that have been shifted by the shift count number of bits. It is to be appreciated that other instructions or sequences of instructions to perform one or more operations or methods as disclosed herein (e.g., a routine or algorithm using the packed data operation mask shift instruction) may also be stored on the storage medium.

Examples of different types of machines include, but are not limited to, instruction processing apparatus, instruction execution apparatus, processors (e.g., general-purpose processors and special-purpose processors), and various electronic devices having one or more instruction processing apparatus, instruction execution apparatus, and/or processors. A few representative examples of such electronic devices include, but are not limited to, computer systems, desktops, laptops, notebooks, servers, network routers, network switches, nettops, set-top boxes, cellular phones, video game controllers, etc.

Figure 4:
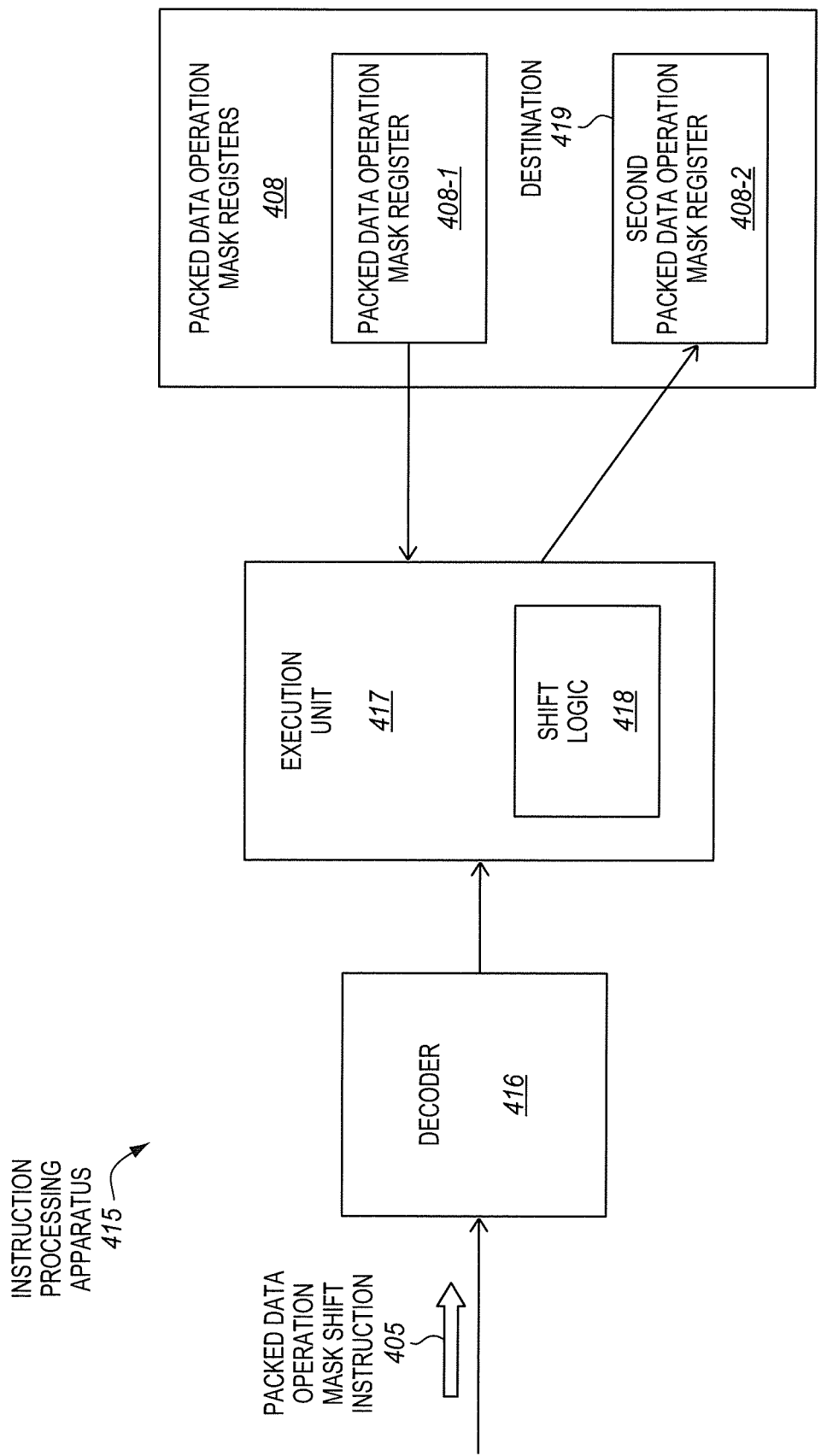
FIG. 4 is a block diagram of an example embodiment of an instruction processing apparatus having an execution unit that is operable to execute instructions including an example embodiment of a packed data operation mask shift instruction.

FIG. 4 is a block diagram of an example embodiment of an instruction processing apparatus 415 having an execution unit 417 that is operable to execute instructions including an example embodiment of a packed data operation mask shift instruction 405. In some embodiments, the instruction processing apparatus may be a processor and/or may be included in a processor. For example, in some embodiments, the instruction processing apparatus may be, or may be included in, the processor 100 of FIG. 1, or one similar. Alternatively, the instruction processing apparatus may be included in a different processor, or electronic system.

The instruction processing apparatus 415 may receive the packed data operation mask shift instruction 405. The packed data operation mask shift instruction may represent a machine instruction, macroinstruction, or control signal that is recognized by the instruction processing apparatus. The instruction processing apparatus may have specific or particular circuitry or other logic (e.g., software combined with hardware and/or firmware) that is operable to process the instruction and/or store a result in response to, as a result of, or as specified by the instruction.

The illustrated embodiment of the instruction processing apparatus includes an instruction decoder 416. The decoder may receive and decode higher-level machine instructions or macroinstructions, such as the received packed data operation mask shift instruction. The decoder may generate and output one or more lower-level micro-operations, micro-code entry points, microinstructions, or other lower-level instructions or control signals, which reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms. Examples of suitable mechanisms include, but are not limited to, microcode read only memories (ROMs), look-up tables, hardware implementations, programmable logic arrays (PLAs), other mechanisms used to implement decoders known in the art, etc.

Alternatively, rather than having the decoder 416, in one or more other embodiments, the apparatus may instead have an instruction emulator, translator, morpher, interpreter, or other instruction conversion logic. Various different types of instruction conversion logic are known in the arts and may be implemented in software, hardware, firmware, or a combination thereof. The instruction conversion logic may receive the packed data operation mask shift instruction, emulate, translate, morph, interpret, or otherwise convert it into one or more corresponding derived instructions or control signals. In still other embodiments, the instruction processing apparatus may have both a decoder and additional instruction conversion logic. For example, the instruction processing apparatus may have instruction conversion logic to convert the packed data operation mask shift instruction into a second instruction, and a decoder to decode the second instruction into one or more lower-level instructions or control signals executable by native hardware of the instruction processing apparatus. Some or all of the instruction conversion logic may be located off-die from the rest of the instruction processing apparatus, such as on a separate die or in an off-die memory.

Referring again to FIG. 4, the instruction processing apparatus also includes a packed data operation mask register 408-1. The packed data operation mask register 408-1 is operable to store a packed data operation mask. As previously mentioned, the packed data operation mask shift instruction may explicitly specify (e.g., through one or more fields) or otherwise indicate the packed data operation mask register as a source. The packed data operation mask shift instruction may also specify or otherwise indicate a destination 419. As shown, in some embodiments, the destination 419 may be a second packed data operation mask register 408-2. Alternatively, the destination may be another register or memory location. In some embodiments, the packed data operation mask registers 408-1, 408-2 may be among a set of packed data operation mask registers (e.g., a register file) 408.

The packed data operation mask registers may each represent an on-board processor storage location. The packed data operation mask registers may represent architectural registers. The packed data operation mask registers may be visible to the software and/or programmer (e.g., software-visible) and/or may be registers that are indicated or specified by macroinstructions (e.g., the packed data operation mask shift instruction) to identify an operand. The packed data operation mask registers may be implemented in different ways in different microarchitectures using well known techniques and are not limited to any known particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

The instruction processing apparatus also includes the execution unit 417. The execution unit is coupled with the packed data operation mask register 408-1 and the destination 419. The execution unit is also coupled with the decoder. The execution unit may receive from the decoder one or more micro-operations, micro-code entry points, microinstructions, other instructions, or other control signals, which reflect, or are derived from, the packed data operation mask shift instruction.

The execution unit is operable, in response to and/or as a result of the packed data operation mask shift instruction indicating the packed data operation mask register 408-1 as a source, indicating a shift count number of bits (e.g., with an immediate), and indicating the destination 419, to store a result in the destination 419. The result may include a sequence of bits of the packed data operation mask that have been shifted by the shift count number of bits. By way of example, the execution unit may include arithmetic logic unit, a logic unit, a shifter unit, a shifter circuit, a functional unit, or the like. The execution unit may include shift logic 418 operable to shift a packed data operation mask. The execution unit and/or the shift logic may include circuitry or other execution logic (e.g., software, firmware, hardware, or a combination) operable to implement the operation of the instruction (e.g., execute one or more microinstructions).

In some embodiments, the packed data operation mask shift instruction may be a packed data operation mask shift right logical instruction. The packed data operation mask shift right logical instruction may be operable to cause the execution unit to logically shift the sequence of the bits of the packed data operation mask to the right by the shift count number of bits, and shift in the shift count number of zeros (i.e., binary zeros or cleared bits) on the left. Each bit of the packed data operation mask may be shifted by the shift count number of bit positions to the right. Bits shifted out on the right may be discarded. The vacated bit positions on the left may be filled in with replacement bits. In logical shifts, the replacement bits may all have the binary value of zero. In other embodiments, the packed data operation mask shift instruction may be a packed data operation mask shift left logical instruction. The packed data operation mask shift left logical instruction may be operable to cause the execution unit to logically shift the sequence of the bits of the packed data operation mask to the left by the shift count number of bits, and shift in the shift count number of zeros as replacement bits to fill the vacated bit positions on the right.

In still other embodiments, the packed data operation mask shift instruction may be a packed data operation mask shift right arithmetic instruction. The packed data operation mask shift right arithmetic instruction may be operable to cause the execution unit to arithmetically shift the sequence of the bits of the packed data operation mask to the right by the shift count number of bits, and shift in the shift count number of replacement bits on the left. In arithmetic shifts, each of the replacement bits may have the binary value of the sign bit for signed representations and/or the leftmost bit of the packed data operation mask. In further embodiments, the packed data operation mask shift instruction may be a packed data operation mask shift left arithmetic instruction. The packed data operation mask shift left arithmetic instruction may be operable to cause the execution unit to arithmetically shift the sequence of the bits of the packed data operation mask to the left by the shift count number of bits, and shift in the shift count number zeroes.

In various embodiments, the packed data operation mask may be 8-bits, 16-bits, 32-bits, or 64-bits. In some cases, an instruction set may include a different instruction for each of these different sizes of packed data operation masks, and an opcode of the instruction may implicitly indicate the size of the corresponding packed data operation mask, although this is not required. The packed data operation mask register may be at least as large as, or optionally larger than, the largest size of packed data operation mask supported. In one example, the packed data operation mask register may be 64-bits wide, although this is not required.

Figure 5A:
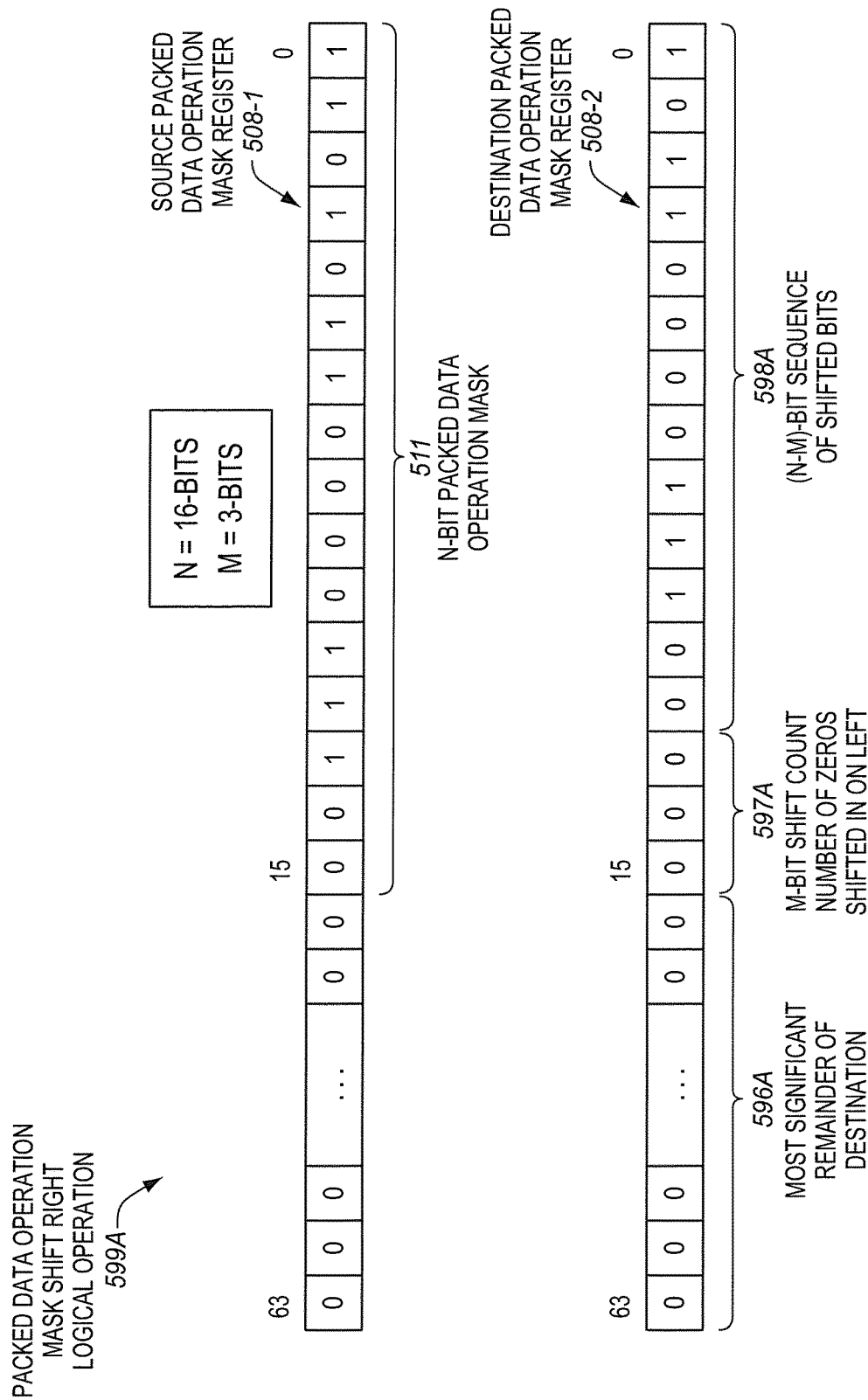
FIG. 5A is a block diagram of an example embodiment of a packed data operation mask shift right logical operation that may be performed by the execution unit in response to and/or as a result of a packed data operation mask shift right logical instruction.

FIG. 5A is a block diagram of an example embodiment of a packed data operation mask shift right logical operation 599A that may be performed by the execution unit in response to and/or as a result of a packed data operation mask shift right logical instruction (e.g., instruction 405). The instruction indicates a source packed data operation mask register 508-1 and a destination packed data operation mask register 508-2. In this particular embodiment, the source and destination packed data operation mask registers are each 64-bits wide. Alternatively, in other embodiments, these registers may be either wider (e.g., 80-bits, 128-bits, etc.) or narrower (e.g., 8-bits, 16-bits, 32-bits, 48-bits, etc.).

An N-bit packed data operation mask 511 is stored in the source packed data operation mask register 508-1, where N is an integer number of bits. In this particular embodiment, the N-bit packed data operation mask is 16-bits wide (i.e., N=16). Alternatively, in other embodiments, the N-bit packed data operation mask may be either wider (e.g., 32-bits, 64-bits, etc.) or narrower (e.g., 4-bits, 8-bits, etc.). In some aspects, the size of the N-bit packed data operation mask may depend upon a corresponding packed data width and the width of data elements of the packed data. The N-bit packed data operation mask may contain the active bits, utilized bits, or meaningful bits of the packed data operation mask register, whereas the remaining highest order bits of the packed data operation mask register may represent non-active bits, un-utilized bits, un-meaningful bits, or extraneous bits.

The instruction indicates an M-bit shift count number of bits, where M is an integer number of bits. By way of example, the M-bit shift count number of bits may be indicated by an immediate of the instruction, an operand of the instruction, in a register indicated by the instruction, or otherwise. In this particular embodiment, the M-bit shift count number of bits is 3-bits (i.e., M=3). Alternatively, in other embodiments, the M-bit shift count number of bits may be either more or less than 3-bits. M may be either less than, equal to, or greater than N.

A result is stored in the destination packed data operation mask register 508-2 in response to and/or as a result of the packed data operation mask shift right logical instruction. As shown, in some embodiments, the result may include:

(a) in a least significant N-bits of the destination (e.g., in the illustrated embodiment the rightmost 16-bits of the 64-bit destination packed data operation mask register), in a less significant portion thereof an (N−M)-bit sequence 598A of bits of the N-bit packed data operation mask that have been logically shifted to the right by the M-bit shift count number of bits, and in a more significant portion thereof an M-bit shift count number of bits 597A that all have a same bit value (i.e., that are all cleared or binary zero (0) in the case of this logical shift instruction); and (b) in a most significant remainder of the destination (e.g., in the illustrated embodiment the leftmost 48-bits of the 64-bit destination packed data operation mask register) a plurality of bits that all have a predetermined value 596A. As shown, in the illustrated embodiment, each of these bits may be cleared or binary zero (0). Alternatively, these bits may have another predetermined value (e.g., all set or binary one (1)).

Figure 5B:
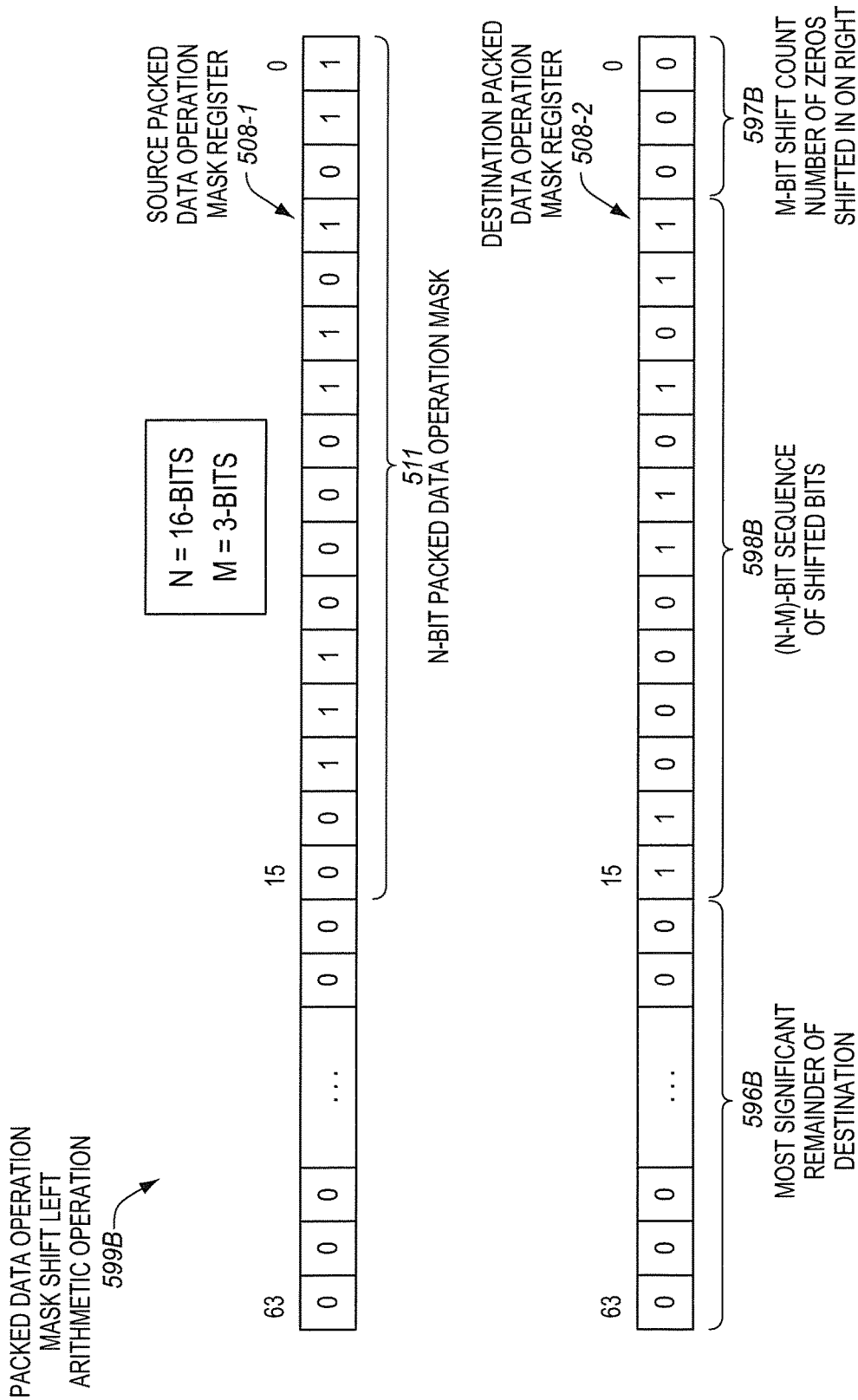
FIG. 5B is a block diagram of an example embodiment of a packed data operation mask shift left arithmetic operation that may be performed by the execution unit in response to and/or as a result of a packed data operation mask shift left arithmetic instruction.

FIG. 5B is a block diagram of an example embodiment of a packed data operation mask shift left arithmetic operation 599B that may be performed by the execution unit in response to and/or as a result of a packed data operation mask shift left arithmetic instruction (e.g., instruction 405). The packed data operation mask shift left arithmetic operation is similar to the aforementioned packed data operation mask shift right logical operation, with a few exceptions. To avoid obscuring the description, the similarities will not be repeated, but rather, the differences will primarily be mentioned.

One notable difference is that, the result includes, in a least significant N-bits of the destination (e.g., in the illustrated embodiment the rightmost 16-bits of the 64-bit destination packed data operation mask register), in a more significant portion thereof an (N-M)-bit sequence 598B of bits of the N-bit packed data operation mask that have been arithmetically shifted to the left by the M-bit shift count number of bits, and in a less significant portion thereof an M-bit shift count number of bits 597B that all have a same bit value equal to zero. Also shown is a most significant remainder of destination 596B.

These are just a few illustrative example embodiments. In still other embodiments, the data stored in the least significant and most significant portions of the destination may be swapped. In other words, the packed data operation mask may be in most significant instead of least significant portions of the registers.

To avoid obscuring the description, a relatively simple instruction processing apparatus has been shown and described. In other embodiments, the instruction processing apparatus or processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, or various different combinations thereof. Moreover, other embodiments may have multiple different types of execution units, with at least one of these execution units being responsive to an embodiment of an instruction as disclosed herein. Still other embodiments may have multiple cores, logical processors, or execution engines. An execution unit operable to execute an embodiment of an instruction as disclosed herein may be included within at least one, at least two, most, or all of the cores, logical processors, or execution engines. There are literally numerous different possible combinations and configurations of such components in processors and other instruction processing apparatus. The scope of the invention is not limited to any known such combination or configuration.

Figure 6:
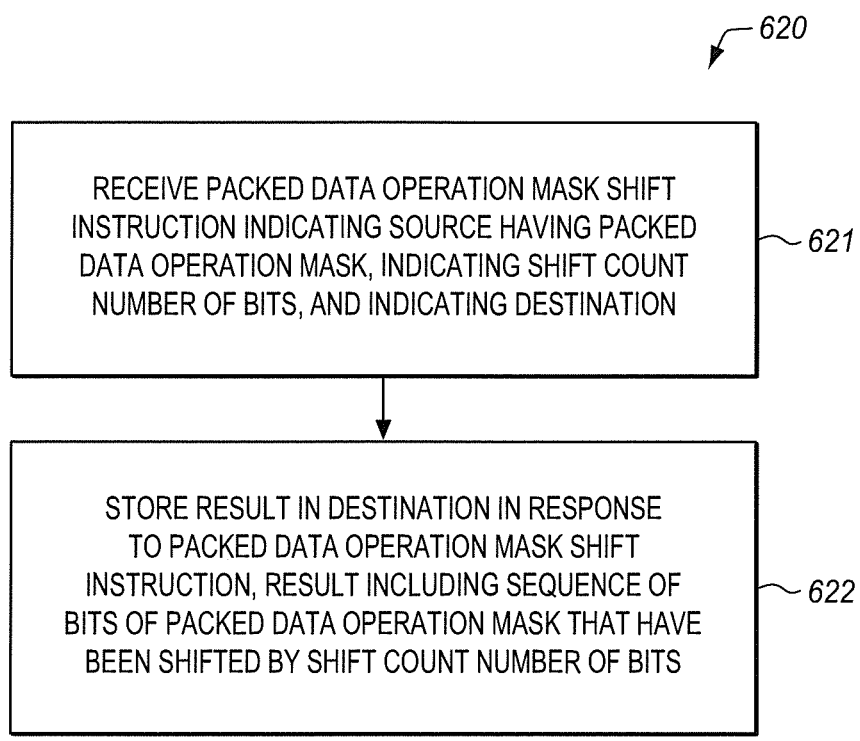
FIG. 6 is a block flow diagram of an example embodiment of a method of processing an example embodiment of a packed data operation mask shift instruction.

FIG. 6 is a block flow diagram of an example embodiment of a method 620 of processing an example embodiment of a packed data operation mask shift instruction. In various embodiments, the method may be performed by a general-purpose processor, a special-purpose processor (e.g., a graphics processor or a digital signal processor), or another type of digital logic device or instruction processing apparatus. In some embodiments, the method 620 may be performed by the processor 100 of FIG. 1, or the instruction processing apparatus 415 of FIG. 4, or a similar processor or instruction processing apparatus. Alternatively, the method 620 may be performed by different embodiments of processors or instruction processing apparatus. Moreover, the processor 100 of FIG. 1, and the instruction processing apparatus 415 of FIG. 4, may perform embodiments of operations and methods either the same as, similar to, or different than those of the method 620 of FIG. 6.

The method includes receiving the packed data operation mask shift instruction, at block 621. The packed data operation mask shift instruction specifies or otherwise indicates a source having a packed data operation mask, specifies or otherwise indicates a shift count number of bits, and specifies or otherwise indicates a destination. The source may be implicit to the instruction or explicitly specified in an instruction format or encoding of the instruction (e.g., bits or one or more fields). The shift count may be specified by an immediate of the instruction, an operand of the instruction, in a register indicated by the instruction, or otherwise. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache).

Then, a result is stored in the destination in response to the packed data operation mask shift instruction, at block 622. The result includes a sequence of bits of the packed data operation mask that have been shifted by the shift count number of bits. By way of example, an execution unit, instruction processing apparatus, or processor may shift the sequence of bits.

As previously mentioned, in various embodiments, the sequence of bits of the packed data operation mask may be shifted right logically and a shift count number of zeros may be shifted in on the left (e.g., if the instruction is a packed data operation mask shift right logical instruction), shifted left logically and a shift count number of zeros may be shifted in on the right (e.g., if the instruction is a packed data operation mask shift left logical instruction), shifted right arithmetically and a shift count number of sign bits may be shifted in on the left (e.g., if the instruction is a packed data operation mask shift right arithmetic instruction), or shifted left arithmetically and a shift count number of zeros may be shifted in on the right (e.g., if the instruction is a packed data operation mask shift left arithmetic instruction).

In various embodiments, the packed data operation mask may be 8-bits, 16-bits, 32-bits, or 64-bits. The packed data operation mask register may be at least as large as, or optionally larger than, the largest size of packed data operation mask supported by the processor or instruction processing apparatus. In one example, the packed data operation mask register may be 64-bits wide, although this is not required.

The illustrated method includes operations that are visible from outside a processor or instruction processing apparatus (e.g., from a software perspective). In other embodiments, the method may optionally include one or more other operations (e.g., one or more operations occurring internally within the processor or instruction processing apparatus). By way of example, after the instruction is received, the instruction may be decoded, translated, emulated, or otherwise converted, into one or more other instructions or control signals. The first and second packed data operation masks may be accessed and/or received. An execution unit may be enabled to perform the shift according to the instruction, and may perform the shift. The method may also be used along with other operations and/or methods. For example, the method may include receiving a masked packed data instruction that indicates the result or the destination as a mask or predicate operand to mask or predicate a packed data operation on packed data.

Figure 7:
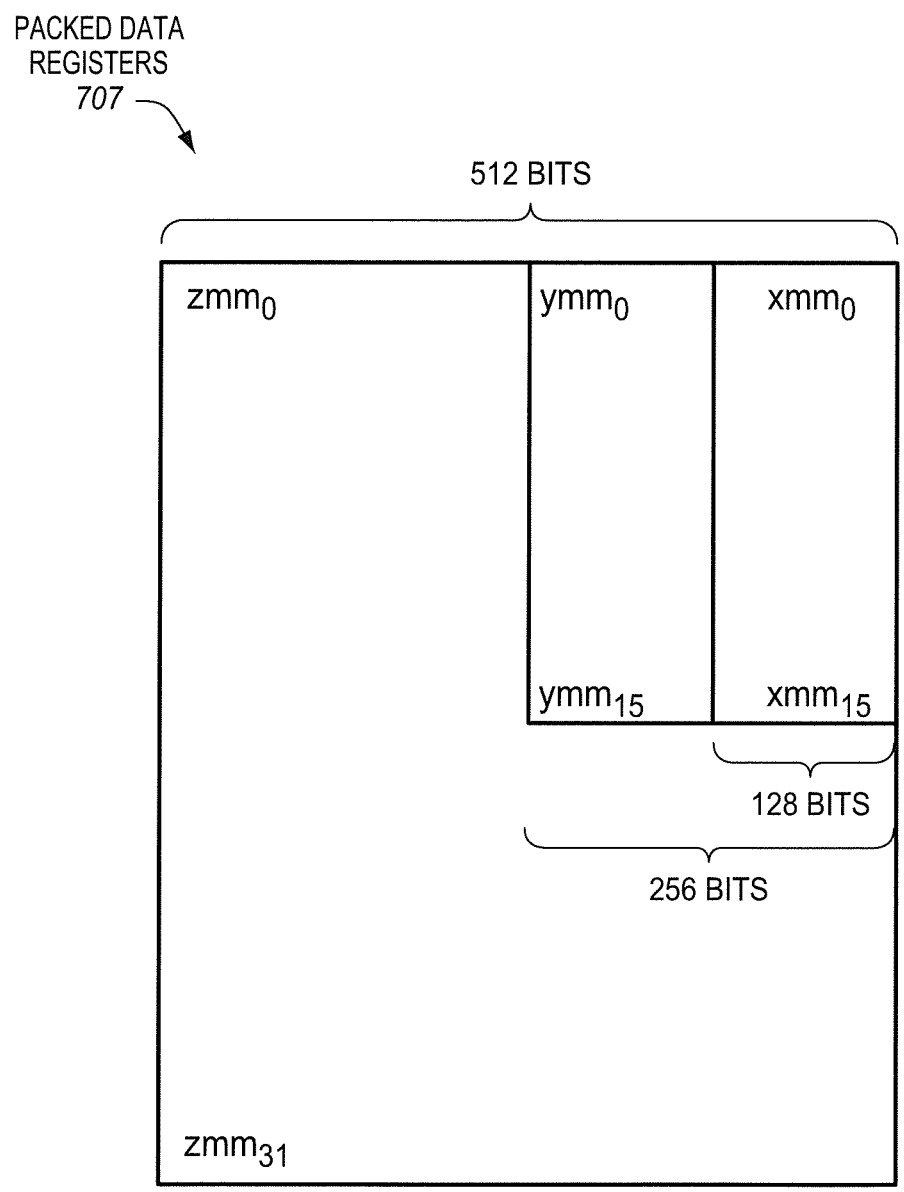
FIG. 7 is a block diagram of an example embodiment of a suitable set of packed data registers.

FIG. 7 is a block diagram of an example embodiment of a suitable set of packed data registers 707. The illustrated packed data registers include thirty-two 512-bit wide packed data or vector registers. These thirty-two 512-bit wide registers are labeled ZMM0 through ZMM31. In the illustrated embodiment, the lower order 256-bits of the lower sixteen of these registers, namely ZMM0-ZMM15, are aliased or overlaid on respective 256-bit wide packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit wide registers ZMM0 through ZMM31 are operable to hold 512-bit packed data, 256-bit packed data, or 128-bit packed data. The 256-bit wide registers YMM0-YMM15 are operable to hold 256-bit packed data, or 128-bit packed data. The 128-bit wide registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 8:
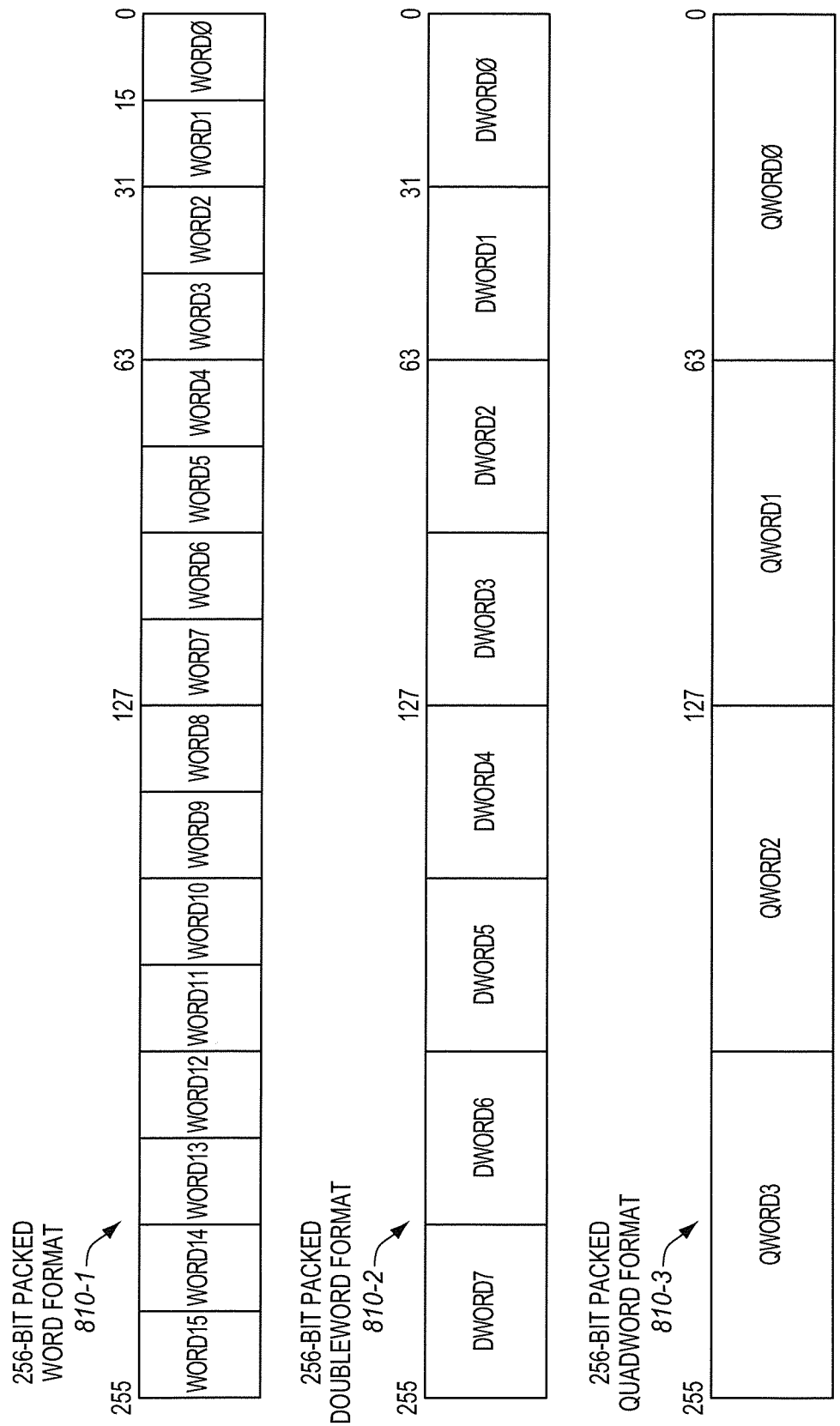
FIG. 8 is a block diagram illustrating several example embodiments of suitable packed data formats.

FIG. 8 is a block diagram illustrating several example embodiments of suitable packed data formats. A 256-bit packed word format 810-1 is 256-bits wide and includes sixteen 16-bit word data elements. The sixteen 16-bit word data elements are labeled in the illustration from least to most significant bit positions as WORD0 through WORD15. A 256-bit packed doubleword format 810-2 is 256-bits wide and includes eight 32-bit doubleword (dword) data elements. The eight 32-bit doubleword data elements are labeled in the illustration from least to most significant bit positions as DWORD0 through DWORD7. A 256-bit packed quadword format 810-3 is 256-bits wide and includes four 64-bit quadword data elements. The four 64-bit quadword data elements are labeled in the illustration from the least to most significant bit positions as QWORD0 through QWORD3.

Other packed data formats are also suitable. For example, other suitable 256-bit packed data formats include 256-bit packed 8-bit byte format, 256-bit packed 32-bit single precision floating point format, and 256-bit packed 64-bit double precision floating point format. The single and double precision floating point formats may respectively appear similar to the illustrated doubleword format 810-2 and quadword format 810-3, although the meaning/interpretation of the bits within the data elements may be different. Moreover, packed data formats either larger and/or smaller than 256-bits are also suitable. For example, 512-bit (or larger) packed data formats and/or 128-bit (or smaller) packed data formats of the aforementioned data types are also suitable. In general, the 512-bit packed data formats may have twice as many data elements as the 256-bit packed data formats for the same data type, while the 128-bit packed data formats may have half as many data elements as the 256-bit packed data formats for the same data type. Generally, the number of packed data elements is equal to the size in bits of the packed data divided by the size in bits of the packed data elements.

Figures 9, 10:
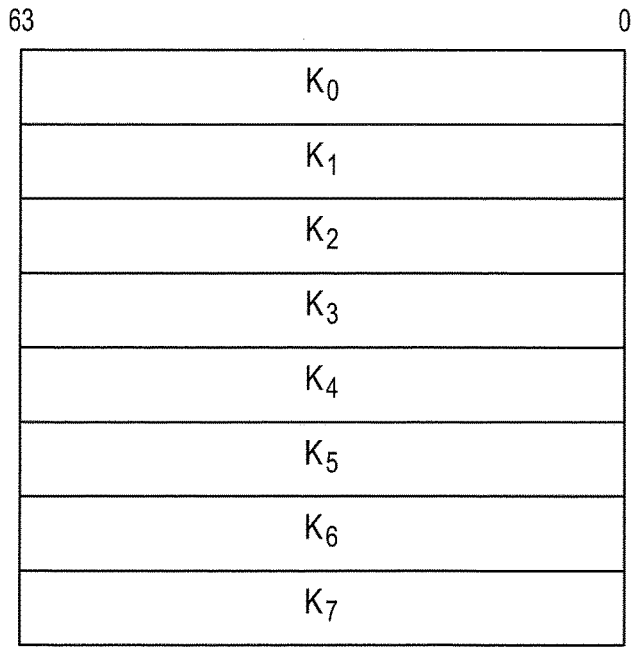
FIG. 9 is a table illustrating that the number of packed data operation mask bits depends upon the packed data width and the packed data element width.
FIG. 10 is a block diagram of an example embodiment of a suitable set of packed data operation mask registers.

FIG. 9 is a table illustrating that the number of packed data operation mask bits 923 depends upon the packed data width and the packed data element width. Packed data widths of 128-bits, 256-bits, and 512-bits are shown, although other widths are also possible. Packed data element widths of 8-bit bytes, 16-bit words, 32-bit doublewords (dwords) or single precision floating point, and 64-bit quadwords (Qwords) or double precision floating point are considered, although other widths are also possible.

As shown, when the packed data width is 128-bits, 16-bits may be used for masking when the packed data element width is 8-bits, 8-bits may be used for masking when the packed data element width is 16-bits, 4-bits may be used for masking when the packed data element width is 32-bits, and 2-bits may be used for masking when the packed data element width is 64-bits. When the packed data width is 256-bits, 32-bits may be used for masking when the packed data element width is 8-bits, 16-bits may be used for masking when the packed data element width is 16-bits, 8-bits may be used for masking when the packed data element width is 32-bits, and 4-bits may be used for masking when the packed data element width is 64-bits. When the packed data width is 512-bits, 64-bits may be used for masking when the packed data element width is 8-bits, 32-bits may be used for masking when the packed data element width is 16-bits, 16-bits may be used for masking when the packed data element width is 32-bits, and 8-bits may be used for masking when the packed data element width is 64-bits.

FIG. 10 is a block diagram of an example embodiment of a suitable set of packed data operation mask registers 1008. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits wide. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). The packed data operation mask registers may be implemented in different ways using well known techniques and are not limited to any known particular type of circuit. Various different types of registers are suitable as long as they are capable of storing and providing data as described herein. Examples of suitable registers include, but are not limited to, dedicated physical registers, dynamically allocated physical registers using register renaming, and combinations thereof.

In some embodiments, the packed data operation mask registers 1008 may be a separate, dedicated set of architectural registers. In some embodiments, the instructions may encode or specify the packed data operation mask registers in different bits or one or more different field combinations of an instruction format than that used to encode or specify other types of registers (e.g., packed data registers 108 of FIG. 1). By way of example, the masked packed data instructions may use three bits (e.g., a 3-bit field) to encode or specify any one of the eight packed data operation mask registers k0 through k7. In alternate embodiments, either fewer or more bits may be used when there are fewer or more packed data operation mask registers, respectively. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has an all ones or "no mask" encoding). In other embodiments, either all or only some of the registers may be encoded as a predicate operand.

FIG. 11 is a diagram illustrating an example embodiment of a packed data operation mask register 1108 and showing that the number of bits that are used as a packed data operation mask and/or for masking depends upon the packed data width and the data element width. The illustrated example embodiment of the packed data operation mask register is 64-bits wide, although this is not required. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data width in bits divided by the packed data element width in bits.

Several illustrative examples are shown. Namely, when the packed data width is 512-bits and the packed data element width is 64-bits, then only the lowest-order 8-bits of the register are used as the packed data operation mask. When the packed data width is 512-bits and the packed data element width is 32-bits, then only the lowest-order 16-bits of the register are used as the packed data operation mask. When the packed data width is 512-bits and the packed data element width is 16-bits, then only the lowest-order 32-bits of the register are used as the packed data operation mask. When the packed data width is 512-bits and the packed data element width is 8-bits, then all 64-bits of the register are used as the packed data operation mask. In accordance with the illustrated embodiment, a masked packed data instruction may access and/or utilize only the number of lowest order or least significant bits of the register used for the packed data operation mask based on that instructions associated packed data width and data element width.

In the illustrated embodiment, the lowest-order subset or portion of the register is used for masking, although this is not required. In alternate embodiments a highest-order subset, or some other subset, may optionally be used. Moreover, in the illustrated embodiment, only a 512-bit packed data width is considered, however the same principle applies for other packed data widths, such as, for example, 256-bit and 128-bit widths. As previously mentioned, the use of a 64-bit packed data operation mask register is not required.

Listed below are various particular example embodiments of packed data operation mask shift instructions and operations. In the code, SRC1 is a source, DEST is a destination, imm8 is an immediate used to specify the shift count number of bits, MAX_KL represents the number of bits of SRC1 and DEST, the symbol << represents a left shift, the symbol >> represents a right shift, and the symbol ← represents storing. In some embodiments, SRC1 and DEST are each packed data operation mask registers, and in some embodiments MAX_KL is 64-bits, although this is not required. The illustrated instructions are shift logical instructions. As shown, in some embodiments, the destination may be zeroed prior to storing the shifted bits of the packed data operation mask into the destination, although this is not required. Alternatively, they may be given another predetermined value.

```
KSHIFTLB DEST, SRC1 (SHIFT LEFT BYTE LOGICAL)
COUNT ← imm8[7:0]
DEST[MAX_KL-1:0] ← 0
IF COUNT <= 7
    THEN DEST[7:0] ← SRC1[7:0] << COUNT;
FI;
KSHIFTLW DEST, SRC1 (SHIFT LEFT WORD LOGICAL)
COUNT ← imm8[7:0]
DEST[MAX_KL-1:0] ← 0
IF COUNT <= 15
    THEN DEST[15:0] ← SRC1[15:0] << COUNT;
FI;
KSHIFTLD DEST, SRC1 (SHIFT LEFT DOUBLEWORD LOGICAL)
COUNT ← imm8[7:0]
DEST[MAX_KL-1:0] ← 0
IF COUNT <= 31
    THEN DEST[31:0] ← SRC1[31:0] << COUNT;
FI;
KSHIFTLQ DEST, SRC1 (SHIFT LEFT QUADWORD LOGICAL)
COUNT ← imm8[7:0]
DEST[MAX_KL-1:0] ← 0
IF COUNT <= 63
    THEN DEST[63:0] ← SRC1[63:0] << COUNT;
FI;
KSHIFTRB DEST, SRC1 (SHIFT RIGHT BYTE LOGICAL)
COUNT ← imm8[7:0]
DEST[MAX_KL-1:0] ← 0
IF COUNT <= 7
    THEN DEST[7:0] ← SRC1[7:0] >> COUNT;
FI;
KSHIFTRW DEST, SRC1 (SHIFT RIGHT WORD LOGICAL)
COUNT ← imm8[7:0]
DEST[MAX_KL-1:0] ← 0
IF COUNT <= 15
    THEN DEST[15:0] ← SRC1[15:0] >> COUNT;
FI;
KSHIFTRD DEST, SRC1 (SHIFT RIGHT DOUBLEWORD LOGICAL)
COUNT ← imm8[7:0]
DEST[MAX_KL-1:0] ← 0
IF COUNT <= 31
    THEN DEST[31:0] ← SRC1[31:0] >> COUNT;
FI;
KSHIFTRQ DEST, SRC1 (SHIFT RIGHT QUADWORD LOGICAL)
COUNT ← imm8[7:0]
DEST[MAX_KL-1:0] ← 0
IF COUNT <= 63
    THEN DEST[63:0] ← SRC1[63:0] >> COUNT;
FI;
```

These are just a few illustrative examples. Other embodiments include similar operations for shift right or left arithmetic instructions. Other embodiments may specify the shift count in a way other than the immediate (e.g., in a register indicated by the instruction).

The packed data operation mask shift instructions disclosed herein are general-purpose instructions that have general uses. For example, these instructions may be used, either alone or in combination with other instructions, to shift packed data operation masks and/or mask registers in order to manipulate the masks or mask registers in various different ways that are useful and desired for the particular application, algorithm, or code.

In some embodiments, the packed data operation mask shift instructions disclosed herein may be used in conjunction with a closely affiliated or associated instruction. In some embodiments, the closely affiliated or associated instruction is a shift instruction that is operable to shift a packed data right or left such that at least one packed data element is shifted out on the right or left, respectively. One example of a suitable packed data shift by byte increment instruction is PSRLDQ in an x86 ISA. In some embodiments, a shift operation of a packed data operation mask shift instruction as disclosed herein may be used to parallel or mirror a shift operation performed on data elements of a source packed data as a result of an associated shift instruction. For example, if a shift left instruction is to shift out the two leftmost packed data elements, then a packed data operation mask shift left instruction may specify a shift count of two-bits to shift out the two leftmost bits that correspond to the two shifted out packed data elements.

The associated shift instruction and/or operation on the source packed data may be performed in parallel or together in a code sequence with the packed data operation mask shift instruction and/or operation. In other words, the shift operation performed on the packed data elements may be replicated on the packed data operation mask bits so that the packed data operation mask bits track with the corresponding data elements after the shifting. Advantageously, this may help to maintain the position correspondence between the bits of the packed data operation mask and the corresponding packed data elements. Maintaining this position correspondence may help to allow the bits of the packed data operation mask to track with the corresponding packed data elements, so that these bits may be used to mask subsequent packed data operations (e.g., used by a subsequent masked packed data instruction operating on the packed data result of the shift instruction). However, the scope of the invention is not limited to using the packed data operation mask shift instructions disclosed herein with these associated shift instructions on packed data.

In an alternate use, the packed data operation mask shift instruction may also be used to shift a temporarily stored first packed data operation mask from an upper non-active set of bits of a packed data operation mask register to a least significant active set of bits of the packed data operation mask register which initially store a second packed data operation mask. The first packed data operation mask may be stored in the upper non-active bits of the register temporarily while it is not needed in order to avoid needing to consume an additional packed data operation mask register to store the first mask. This may help to avoid running out of packed data operation mask registers and/or needing to store packed data operation masks into memory when there are no available packed data operation mask registers. Other uses will be apparent based on the present disclosure.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 12A illustrates an exemplary AVX instruction format including a VEX prefix 1202, real opcode field 1230, Mod R/M byte 1240, SIB byte 1250, displacement field 1262, and IMM8 1272. FIG. 12B illustrates which fields from FIG. 12A make up a full opcode field 1274 and a base operation field 1242. FIG. 12C illustrates which fields from FIG. 12A make up a register index field 1244.

VEX Prefix (Bytes 0-2) 1202 is encoded in a three-byte form. The first byte is the Format Field 1240 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1215 (VEX byte 1, bits [4:0]-mmmmm) includes content to encode an implied leading opcode byte. W Field 1264 (VEX byte 2, bit [7]-W)—is represented by the notation VEX.W, and provides different functions depending on the instruction. The role of VEX.vvvv 1220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1268. Size field (VEX byte 2, bit [2]-L)=0, it indicates 128 bit vector; if VEX.L=1, it indicates 256 bit vector. Prefix encoding field 1225 (VEX byte 2, bits [1:0]-pp) provides additional bits for the base operation field.

Real Opcode Field 1230 (Byte 3) is also known as the opcode byte. Part of the opcode is specified in this field.

MOD R/M Field 1240 (Byte 4) includes MOD field 1242 (bits [7-6]), Reg field 1244 (bits [5-3]), and R/M field 1246 (bits [2-0]). The role of Reg field 1244 may include the following: encoding either the destination register operand or a source register operand (the rrr of Rrrr), or be treated as an opcode extension and not used to encode any instruction operand. The role of R/M field 1246 may include the following: encoding the instruction operand that references a memory address, or encoding either the destination register operand or a source register operand.

Scale, Index, Base (SIB)—The content of Scale field 1250 (Byte 5) includes SS1252 (bits [7-6]), which is used for memory address generation. The contents of SIB.xxx 1254 (bits [5-3]) and SIB.bbb 1256 (bits [2-0]) have been previously referred to with regard to the register indexes Xxxx and Bbbb.

The Displacement Field 1262 and the immediate field (IMM8) 1272 contain address data.

Exemplary Register Architecture

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
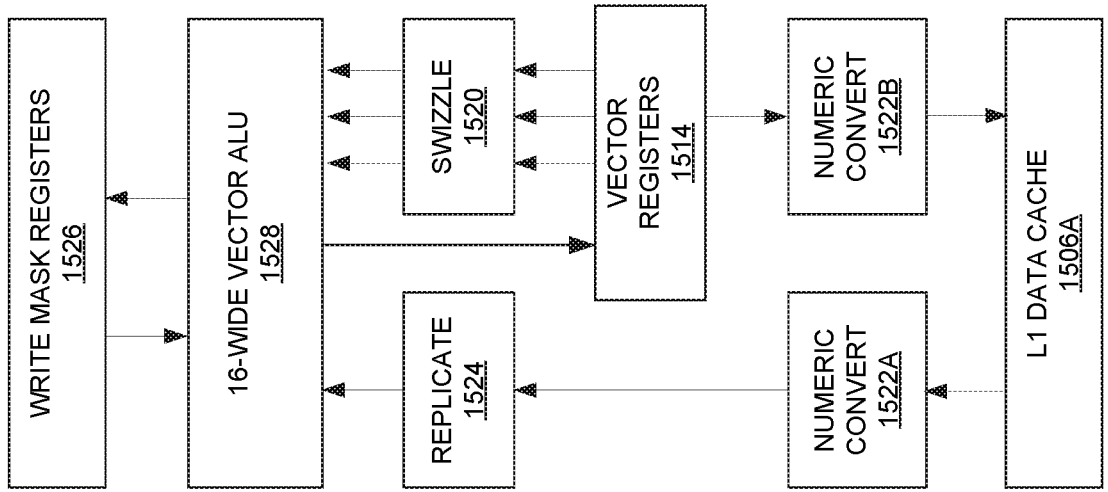
FIG. 15B is an expanded view of part of the processor core in FIG. 15A according to embodiments of the invention.
Figure 15A:
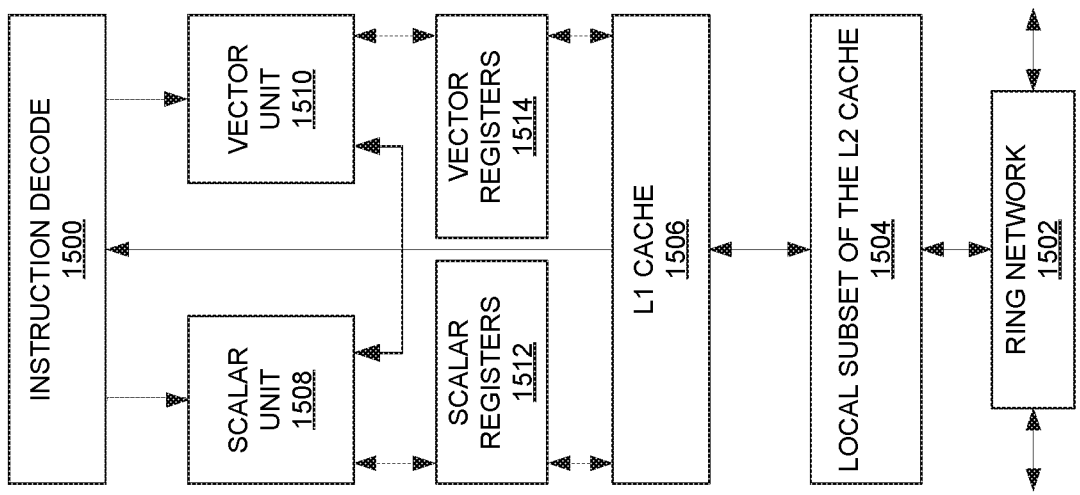
FIG. 15A is a block diagram of a single processor core, along with its connection to the on-die interconnect network and with its local subset of the Level 2 (L2) cache, according to embodiments of the invention.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Processor with Integrated Memory Controller and Graphics

Figure 16:
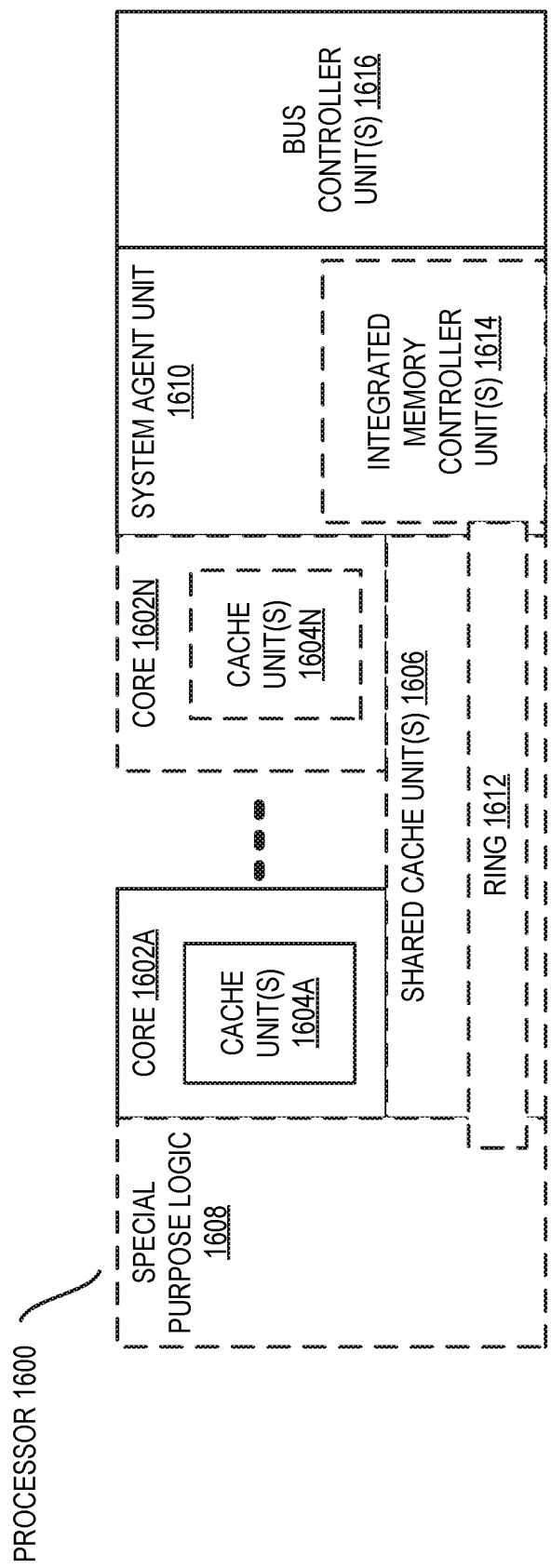
FIG. 16 is a block diagram of a processor that may have more than one core, may have an integrated memory controller, and may have integrated graphics according to embodiments of the invention.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache 1604A-N within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
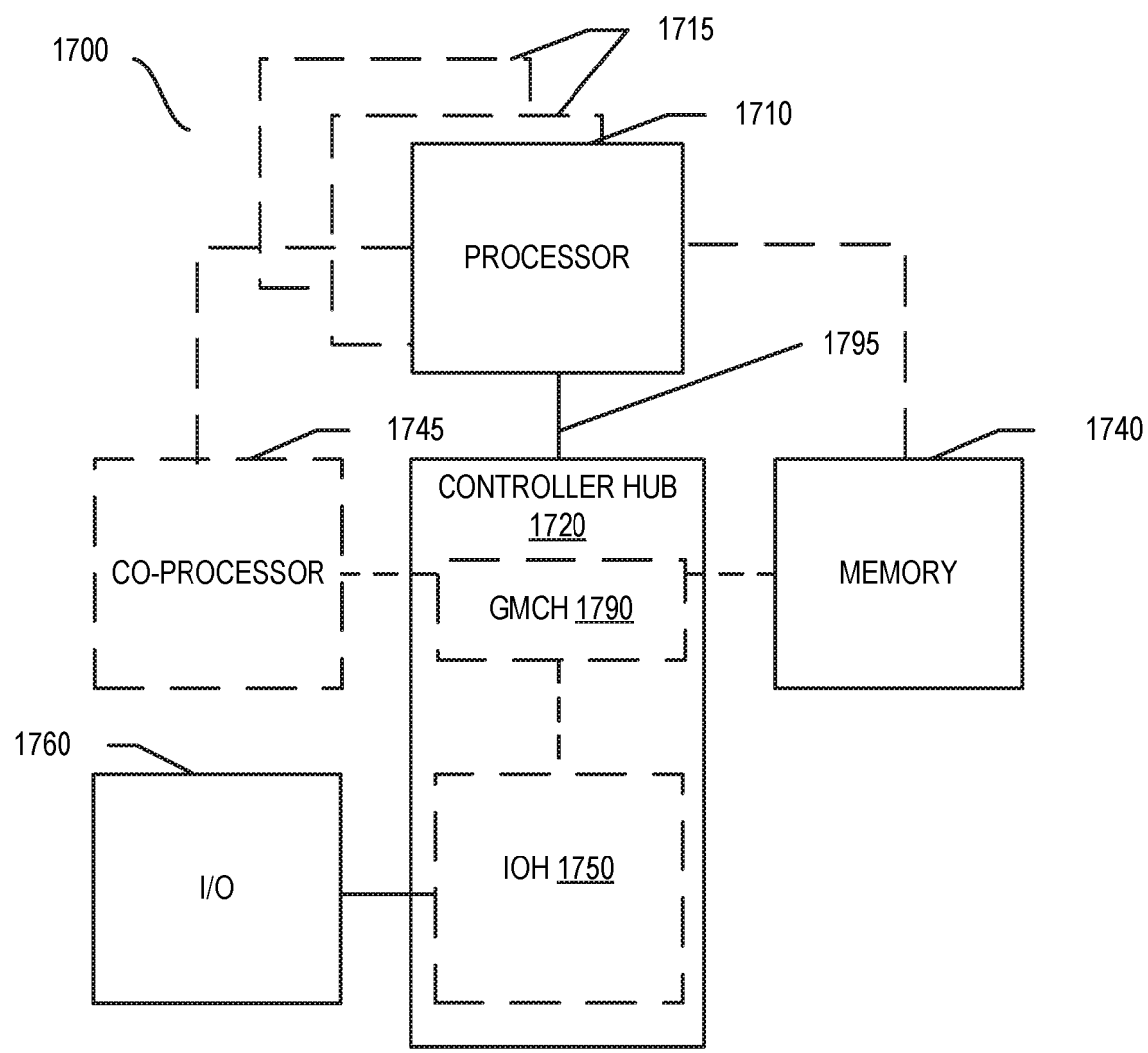
FIG. 17, shown is a block diagram of a system in accordance with one embodiment of the present invention.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
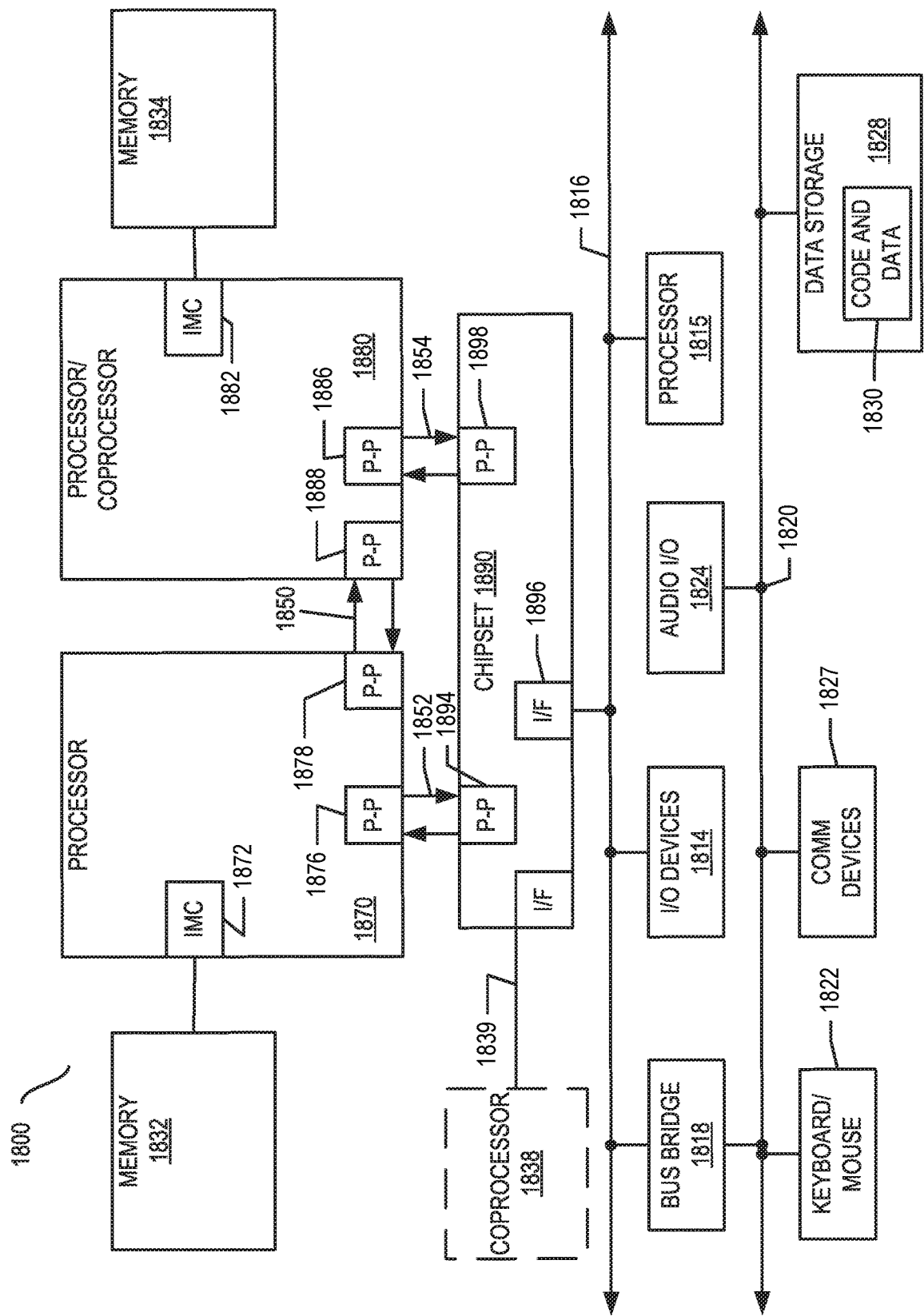
FIG. 18, shown is a block diagram of a first more specific exemplary system in accordance with an embodiment of the present invention.

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
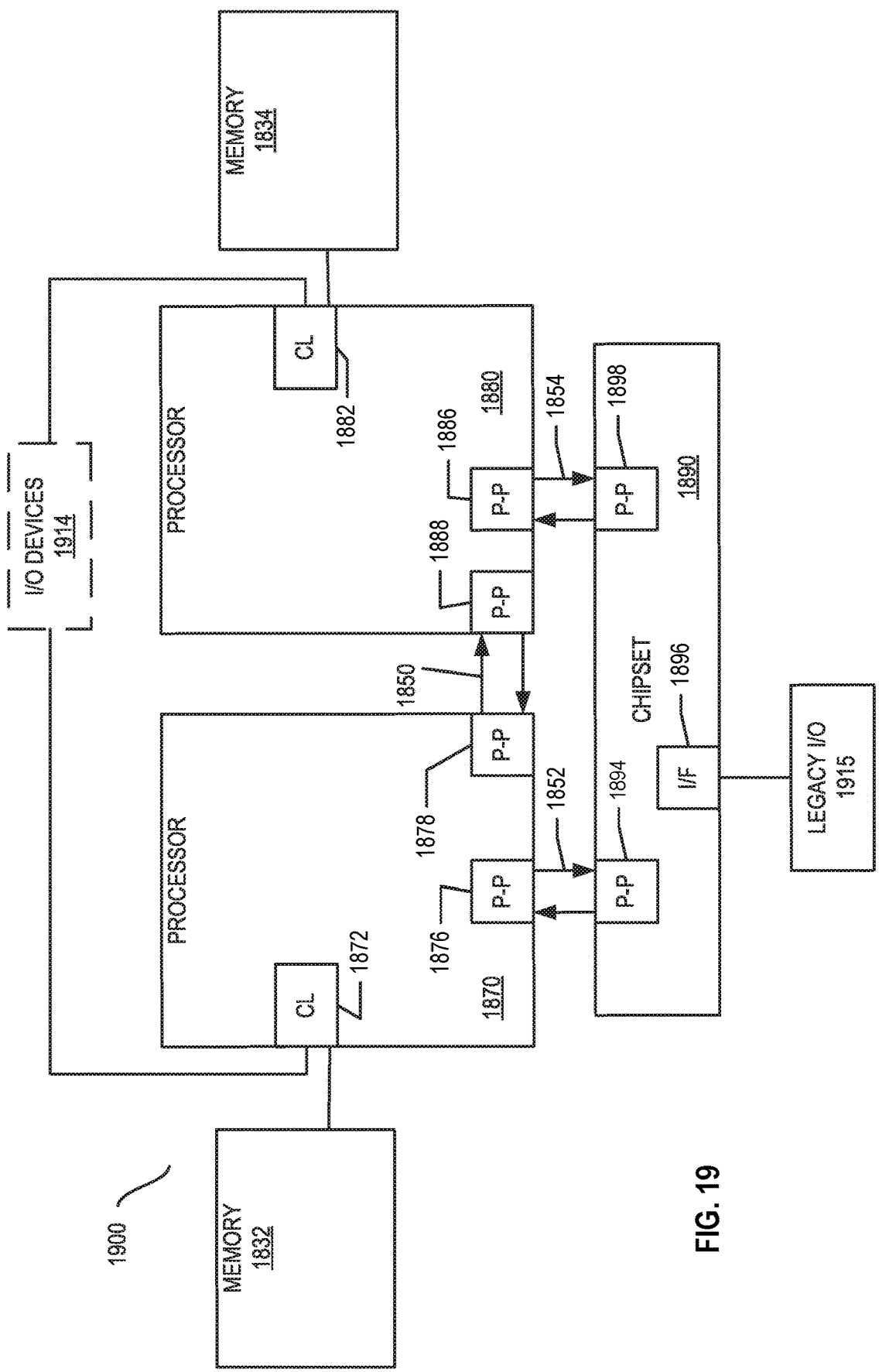
FIG. 19, shown is a block diagram of a second more specific exemplary system in accordance with an embodiment of the present invention.

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
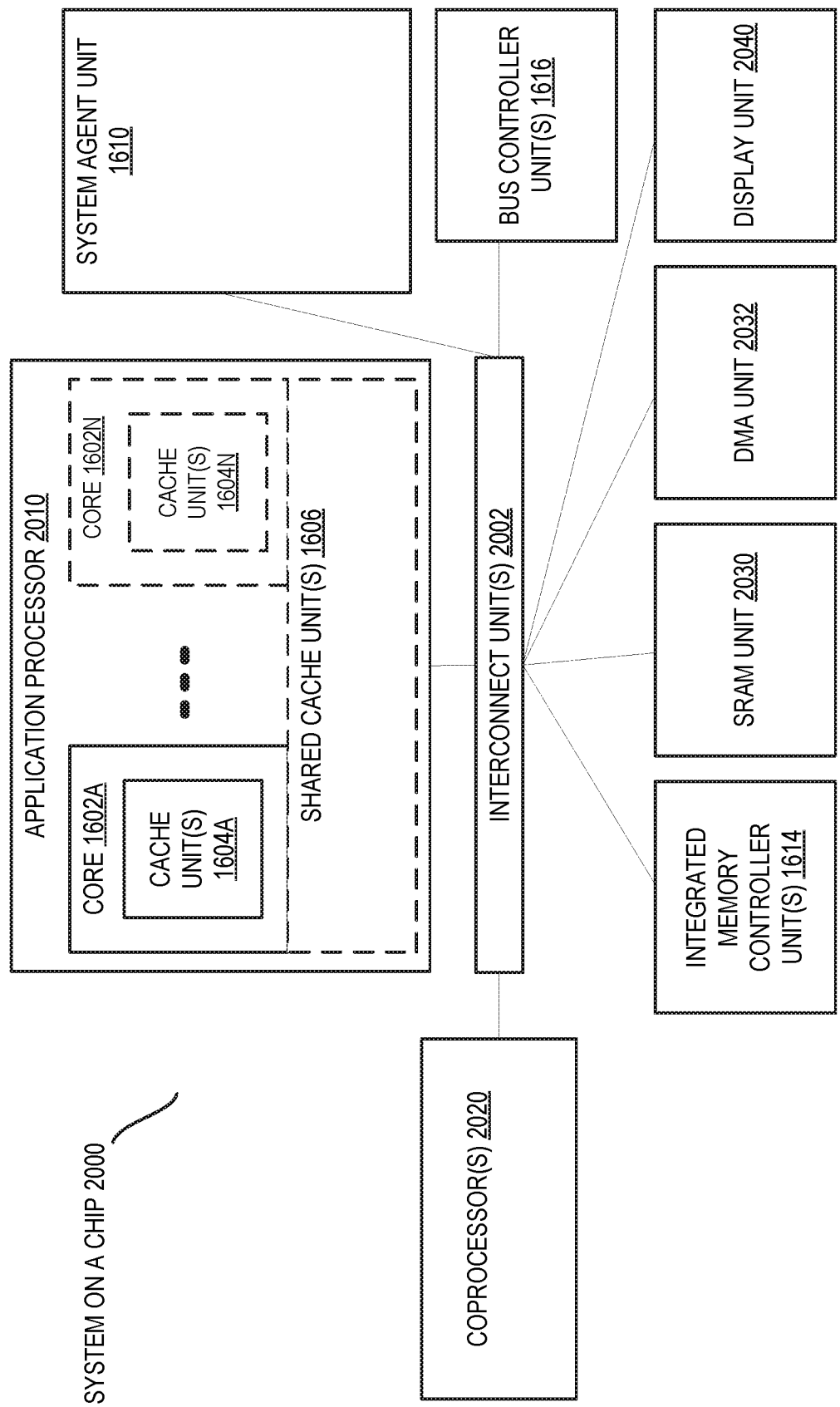
FIG. 20, shown is a block diagram of a SoC in accordance with an embodiment of the present invention.

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 202A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
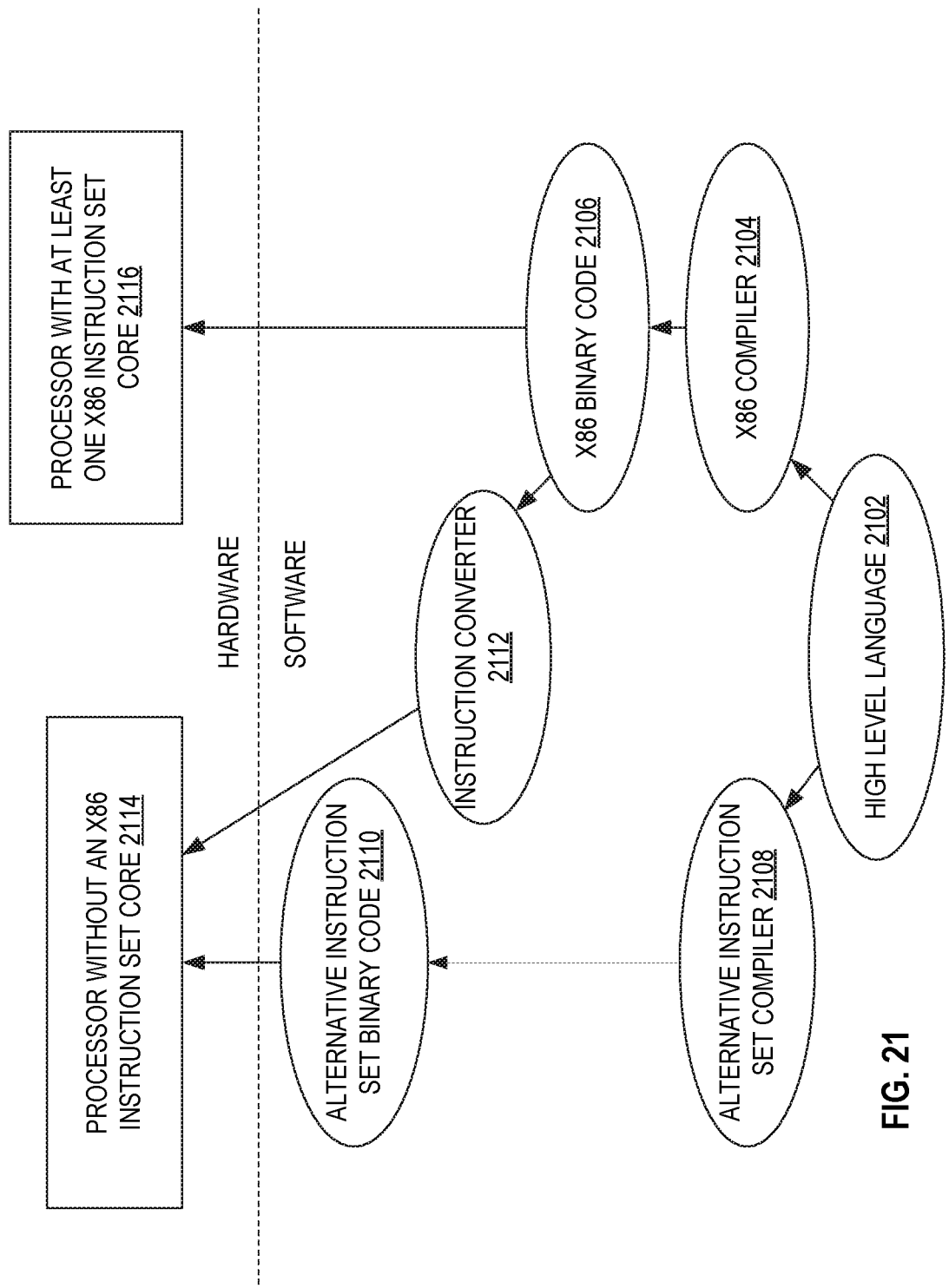
FIG. 21 is a block diagram contrasting the use of a software instruction converter to convert binary instructions in a source instruction set to binary instructions in a target instruction set according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register through one or more intervening components.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

It will also be appreciated, by one skilled in the art, that modifications may be made to the embodiments disclosed herein, such as, for example, to the configurations, forms, functions, and manner of operation and use, of the components of the embodiments. All equivalent relationships to those illustrated in the drawings and described in the specification are encompassed within embodiments of the invention. For simplicity and clarity of illustration, elements illustrated in the figures have not necessarily been drawn to scale. For example, the dimensions of some of the elements may have been exaggerated relative to other elements for clarity. In the figures, arrows are used to show couplings.

Various operations and methods have been described. Some of the methods have been described in a basic form in the flow diagrams, but operations may optionally be added to and/or removed from the methods. In addition, a particular order of the operations may have been described, according to example embodiments, it is to be understood that that particular order is exemplary. Alternate embodiments may optionally perform the operations in different order, combine certain operations, overlap certain operations, etc. Many modifications and adaptations may be made to the methods described and are contemplated.

Certain operations may be performed by hardware components, or may be embodied in machine-executable or circuit-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to instructions, microinstructions, or one or more control signals, derived from a machine instruction to perform certain operations.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
    receiving a packed data operation mask shift instruction of an instruction set of a processor, the packed data operation mask shift instruction indicating a source packed data operation mask register having a packed data operation mask, indicating a shift count number of bits, and indicating a destination packed data operation mask register, wherein the source and destination packed data operation mask registers are among a plurality of packed data operation mask registers that are not general-purpose registers, wherein the source packed data operation mask register supports both merging masking and zeroing masking, and wherein a given packed data operation mask register of the plurality of packed data operation mask registers is not able to be used for predication but all other of the plurality of packed data operation mask registers are able to be used for the predication and support the merging masking and the zeroing masking;
    generating a result with an execution unit including shift circuitry in response to the packed data operation mask shift instruction by shifting the packed data operation mask with the shift circuitry;
    storing the result in the destination packed data operation mask register in response to the packed data operation mask shift instruction, the result including a sequence of bits of the packed data operation mask that have been shifted by the shift count number of bits.

2. The method of claim 1, wherein storing the result comprises storing the sequence of the bits of the packed data operation mask that have been logically shifted to the right by the shift count number of bits with a number of zeros shifted in on the left equal to the shift count number of bits.

3. The method of claim 1, wherein storing the result comprises storing the sequence of the bits of the packed data operation mask that have been logically shifted to the left by the shift count number of bits with a number of zeros shifted in on the right equal to the shift count number of bits.

4. The method of claim 1, wherein the packed data operation mask is an N-bit packed data operation mask, wherein the shift count number of bits is an M-bit shift count number of bits, and wherein the result includes:
    (a) in a least significant N-bits of the destination packed data operation mask register, an (N-M)-bit sequence of the bits of the N-bit packed data operation mask that has been shifted by the M-bit shift count number of bits, and M-bits that all have a same bit value; and
    (b) in a most significant remainder of the destination packed data operation mask register a plurality of bits that all have a value of zero.

5. The method of claim 4, wherein the (N-M)-bit sequence of the bits has been logically shifted by the M-bit shift count number of bits, and wherein the M-bits all have a value of zero.

6. The method of claim 4, wherein the N-bit packed data operation mask is a 16-bit packed data operation mask, and wherein the destination packed data operation mask register includes more than 16-bits.

7. The method of claim 1, further comprising receiving a masked packed data instruction indicating the result as a predicate operand.

8. An apparatus comprising:
    a plurality of general-purpose registers;
    a plurality of packed data operation mask registers, including a packed data operation mask register to store a packed data operation mask, wherein the packed data operation mask register is not a general-purpose register, and wherein all but one of the plurality of packed data operation mask registers, including the packed data operation mask register, can be used for predication and support both merging masking and zeroing masking;
    a decode unit to decode a packed data operation mask shift instruction; and
    an execution unit coupled with the packed data operation mask register, the execution unit including shift circuitry, the execution unit, in response to the decode of the packed data operation mask shift instruction that is to indicate the packed data operation mask register as a source, that is to indicate a shift count number of bits, and that is to indicate a destination, to:
        shift the packed data operation mask with the shift circuitry as part of generation of a result; and
        store the result in the destination, the result to include a sequence of bits of the packed data operation mask that are to have been shifted by the execution unit by the shift count number of bits.

9. The apparatus of claim 8, wherein the execution unit is in response to the packed data operation mask shift instruction to store a result that is to include the sequence of the bits of the packed data operation mask that are to have been logically shifted to the right by the shift count number of bits with a number of zeros shifted in on the left equal to the shift count number of bits.

10. The apparatus of claim 8, wherein the execution unit is, in response to the packed data operation mask shift instruction, to store a result that is to include the sequence of the bits of the packed data operation mask that are to have been logically shifted to the left by the shift count number of bits with a number of zeros shifted in on the right equal to the shift count number of bits.

11. The apparatus of claim 8, wherein the packed data operation mask is an N-bit packed data operation mask, wherein the shift count number of bits is an M-bit shift count number of bits, and wherein the execution unit is, in response to the packed data operation mask shift instruction, to store a result that is to include:
    (a) in a least significant N-bits of the destination, an (N-M)-bit sequence of the bits of the N-bit packed data operation mask that is to have been shifted by the M-bit shift count number of bits, and M-bits that all are to have a same bit value; and (b) in a most significant remainder of the destination a plurality of bits that all are to have a value of zero.

12. The apparatus of claim 11, wherein the execution unit is to store the (N-M)-bit sequence of the bits that is to have been logically shifted by the M-bit shift count number of bits, and the M-bits that all are to have a value of zero.

13. The apparatus of claim 11, wherein the N-bit packed data operation mask is an 8-bit packed data operation mask, and wherein the destination is a packed data operation mask register that is to include more than 8-bits.

14. The apparatus of claim 11, wherein the N-bit packed data operation mask is a 32-bit packed data operation mask, and wherein the destination is a packed data operation mask register that is to include more than 32-bits.

15. The apparatus of claim 8, wherein the packed data operation mask shift instruction is to explicitly specify the packed data operation mask register, is to explicitly specify the destination, and is to specify the shift count number of bits in an immediate.

16. A system comprising:
an interconnect;
a processor coupled with the interconnect, the processor including a plurality of general-purpose registers, and a plurality of packed data operation mask registers, including a packed data operation mask register to store a packed data operation mask, wherein the packed data operation mask register is not a general-purpose register, wherein all but one of the plurality of packed data operation mask registers, including the packed data operation mask register, can be used for predication and support both merging masking and zeroing masking, the processor including shift circuitry, the processor, in response to a packed data operation mask shift instruction of an instruction set of the processor that is to indicate the packed data operation mask register as a source, that is to indicate a shift count number of bits, and that is to indicate a destination, to:
shift the packed data operation mask with the shift circuitry during generation of a result; and
store the result in the destination, the result to include a sequence of bits of the packed data operation mask that are to have been shifted by an execution unit by the shift count number of bits; and
a dynamic random access memory (DRAM) coupled with the interconnect.

17. An article of manufacture comprising:
a non-transitory machine-readable storage medium, the non-transitory machine-readable storage medium storing instructions including a packed data shift instruction and a packed data operation mask shift instruction of an instruction set of a processor,
the packed data operation mask shift instruction to indicate a packed data operation mask register, of a plurality of packed data operation mask registers, that is to have a packed data operation mask, to indicate a shift count number of bits, and to indicate a destination, wherein the packed data operation mask register is not a general-purpose register, wherein all but one of the plurality of packed data operation mask registers, including the packed data operation mask register, can be used for predication and support both merging masking and zeroing masking, the packed data shift instruction when executed by a machine to cause the machine to perform operations that include to perform a shift operation on data elements of a source packed data, and the packed data operation mask shift instruction when executed by the machine that includes shift circuitry is to cause the machine to perform operations that include to:
shift the packed data operation mask with the shift circuitry during generation of a result; and
store the result in the destination in response to the packed data operation mask shift instruction, the result to include a sequence of bits of the packed data operation mask that are to have been shifted by the shift count number of bits, wherein the shift of the packed data operation mask is to mirror the shift operation on the source packed data.

18. The article of manufacture of claim 17, wherein the packed data operation mask is an N-bit packed data operation mask, wherein the shift count number of bits is an M-bit shift count number of bits, and wherein the packed data operation mask shift instruction when executed by the machine is to cause the machine to store a result that is to include:
(a) in a least significant N-bits of the destination, an (N-M)-bit sequence of the bits of the N-bit packed data operation mask that has been shifted by the M-bit shift count number of bits, and M-bits that all have a same bit value; and
(b) in a most significant remainder of the destination a plurality of bits that all have a value of zero.

19. The article of manufacture of claim 18, wherein the (N-M)-bit sequence of the bits are to have been logically shifted by the M-bit shift count number of bits, and the M-bits all are to have a value of zero, wherein the N-bit packed data operation mask is a 16-bit packed data operation mask, and wherein the destination is a packed data operation mask register that is to store more than 16-bits.

20. The article of manufacture of claim 17, wherein the non-transitory machine-readable storage medium further stores a masked packed data instruction that indicates the result as a predicate operand to predicate a packed data operation of the masked packed data instruction.

21. An apparatus comprising:
an instruction converter selected from a group of a binary translator and an instruction emulator to convert a packed data operation mask shift left instruction of a first complex instruction set computing (CISC) instruction set to one or more corresponding instructions of a second different instruction set, the packed data operation mask shift left instruction to have only three bits to explicitly specify a source packed data operation mask register, of a set of packed data operation mask registers, that is to store a source packed data operation mask, and to have an 8-bit immediate to provide a shift count number of bits, wherein all but one of the set of packed data operation mask registers can be used for predication and support both merging masking and zeroing masking; and
a processor coupled with the instruction converter, the processor having at least sixteen general-purpose registers, and the processor to decode and execute the one or more corresponding instructions of the second instruction set, the processor including shift circuitry, the processor, as a result of the one or more corresponding instructions of the second instruction set to store a result in a destination, bits [15:0] of the result to include a value due to the processor logically shifting bits [15:0] of the source packed data operation mask to the left by the shift count number of bits with a number of zeroes shifted in on the right equal to the shift count number of bits.

22. The apparatus of claim 21, wherein bits [63:16] of the result are all to be zeroes.

23. The apparatus of claim 21, wherein the packed data operation mask shift left instruction is to have an instruction format that includes a three-byte VEX Prefix.

24. The apparatus of claim 21, wherein the packed data operation mask shift left instruction is to implicitly indicate that bits [15:0] of the source packed data operation mask are to be shifted.

25. The apparatus of claim 21, wherein the instruction converter is the instruction emulator.

26. The apparatus of claim 21, wherein the instruction converter is the binary translator.

27. A processor comprising:
a plurality of general-purpose registers;
a plurality of packed data operation mask registers, wherein all but one of the plurality of packed data operation mask registers can be used for predication and support both merging masking and zeroing masking;
a decode unit to decode a packed data operation mask shift left instruction that is to have three bits to explicitly specify a source packed data operation mask register, of the plurality of packed data operation mask registers, which is to store a source packed data operation mask, the packed data operation mask shift left instruction to have an 8-bit immediate to provide a shift count number of bits, and the packed data operation mask shift left instruction to have three bits to explicitly specify a destination packed data operation mask register, of the plurality of packed data operation mask registers; and
an execution unit coupled with the decode unit, and coupled with the plurality of packed data operation mask registers, the execution unit including shift circuitry, the execution unit, in response to the decode of the packed data operation mask shift left instruction, to:
shift the source packed data operation mask with the shift circuitry during generation of a result; and
store the result in the destination packed data operation mask register, bits [15:0] of the result to include a value due to a logical shift left by the execution unit of bits [15:0] of the source packed data operation mask by the shift count number of bits, with a number of zeroes to have been shifted in on right equal to the shift count number of bits, and bits [63:16] of the result all to be zeroes,
wherein it is to be implicit to the packed data operation mask shift left instruction that bits [15:0] of the source packed data operation mask are to be shifted.

28. A processor comprising:
at least sixteen general-purpose registers;
a decoder to decode one or more instructions of a first instruction set that are to emulate a packed data operation mask shift left instruction of a second different complex instruction set computing (CISC) instruction set, the packed data operation mask shift left instruction to have a three bit field to specify a packed data operation mask register, which is not to be one of the general-purpose registers, that is to store a source packed data operation mask, and the packed data operation mask shift left instruction having an 8-bit immediate to provide a shift count number of bits, wherein the packed data operation mask register is one of a set of packed data operation mask registers, and wherein all but one of the set of packed data operation mask registers can be used for predication and support both merging masking and zeroing masking; and
execution logic coupled with the decoder, the execution logic including shift circuitry, the execution logic, as a result of the decode of the one or more instructions of the first instruction set to:
shift the source packed data operation mask with the shift circuitry during generation of a result; and
store the result in a destination, bits [15:0] of the result to include a value resulting from a logical shift left by the execution logic of bits [15:0] of the source packed data operation mask by the shift count number of bits with a number of zeroes shifted in on the right equal to the shift count number of bits, wherein bits [63:16] of the result are all to be zeroes.

29. The processor of claim 28, wherein the packed data operation mask shift left instruction is to have an instruction format that includes a three-byte VEX Prefix, and wherein the packed data operation mask shift left instruction is to implicitly indicate that bits [15:0] of the source packed data operation mask are to be shifted.

* * * * *